(12) United States Patent
Kanegae et al.

(10) Patent No.: US 7,697,390 B2
(45) Date of Patent: Apr. 13, 2010

(54) EFFICIENT RECORDING OF INFORMATION ON AN INFORMATION RECORDING MEDIUM HAVING A PLURALITY OF LAYERS

(75) Inventors: Tohru Kanegae, Saitama (JP); Masahiro Kato, Saitama (JP); Eisaku Kawano, Saitama (JP); Masahiro Miura, Saitama (JP); Shoji Taniguchi, Saitama (JP)

(73) Assignee: Pioneer Corporation, Tokyo (JP)

( * ) Notice: Subject to any disclaimer, the term of this patent is extended or adjusted under 35 U.S.C. 154(b) by 624 days.

(21) Appl. No.: 11/597,899

(22) PCT Filed: Jan. 13, 2006

(86) PCT No.: PCT/JP2006/300366

§ 371 (c)(1),
(2), (4) Date: Jan. 29, 2007

(87) PCT Pub. No.: WO2006/075696

PCT Pub. Date: Jul. 20, 2006

(65) Prior Publication Data

US 2009/0103407 A1    Apr. 23, 2009

(30) Foreign Application Priority Data

Jan. 14, 2005    (JP) .............................. 2005-008469

(51) Int. Cl.
*G11B 7/00* (2006.01)

(52) U.S. Cl. ....................................................... 369/94

(58) Field of Classification Search ........................ None
See application file for complete search history.

(56) References Cited

U.S. PATENT DOCUMENTS

| 5,881,032 | A  | * | 3/1999  | Ito et al. ..................... 369/30.1 |
| 6,002,655 | A  | * | 12/1999 | Ono et al. ................. 369/44.27 |
| 6,424,614 | B1 | * | 7/2002  | Kawamura et al. ........ 369/275.3 |
| 6,795,389 | B1 | * | 9/2004  | Nishiuchi et al. ......... 369/275.3 |
| 7,020,066 | B2 | * | 3/2006  | Suzuki ..................... 369/275.3 |
| 7,324,420 | B2 | * | 1/2008  | Lee et al. .................. 369/53.29 |
| 2004/0213126 | A1 | * | 10/2004 | Nishiuchi et al. ............. 369/94 |
| 2007/0201343 | A1 | * | 8/2007  | Kuroda et al. ............ 369/275.3 |

FOREIGN PATENT DOCUMENTS

| EP | 1128368 A1   | 8/2001  |
| JP | 2000-503446  | 3/2000  |
| JP | 2000-311346  | 11/2000 |
| JP | 2001-023237  | 1/2001  |
| JP | 2004-295950  | 10/2004 |
| JP | 2006-24290   | 1/2006  |
| WO | WO 97/15050  | 4/1997  |
| WO | WO 00/62286  | 10/2000 |

* cited by examiner

*Primary Examiner*—Peter Vincent Agustin
(74) *Attorney, Agent, or Firm*—Young & Thompson

(57) ABSTRACT

An information recording medium (100) includes (i) a first recording layer (L0 layer) having a first track and (ii) a second recording layer (L1 layer) having a spiral or coaxial second track sharing the rotation center with the first track. (iii) The first recording layer has a first point (point Bx) indicated by a first address. (iv) The second recording layer has a second point (point Dx) which can be defined according to a predetermined positional relationship (allowable area: 10) with respect to the first point (point Bx).

13 Claims, 14 Drawing Sheets

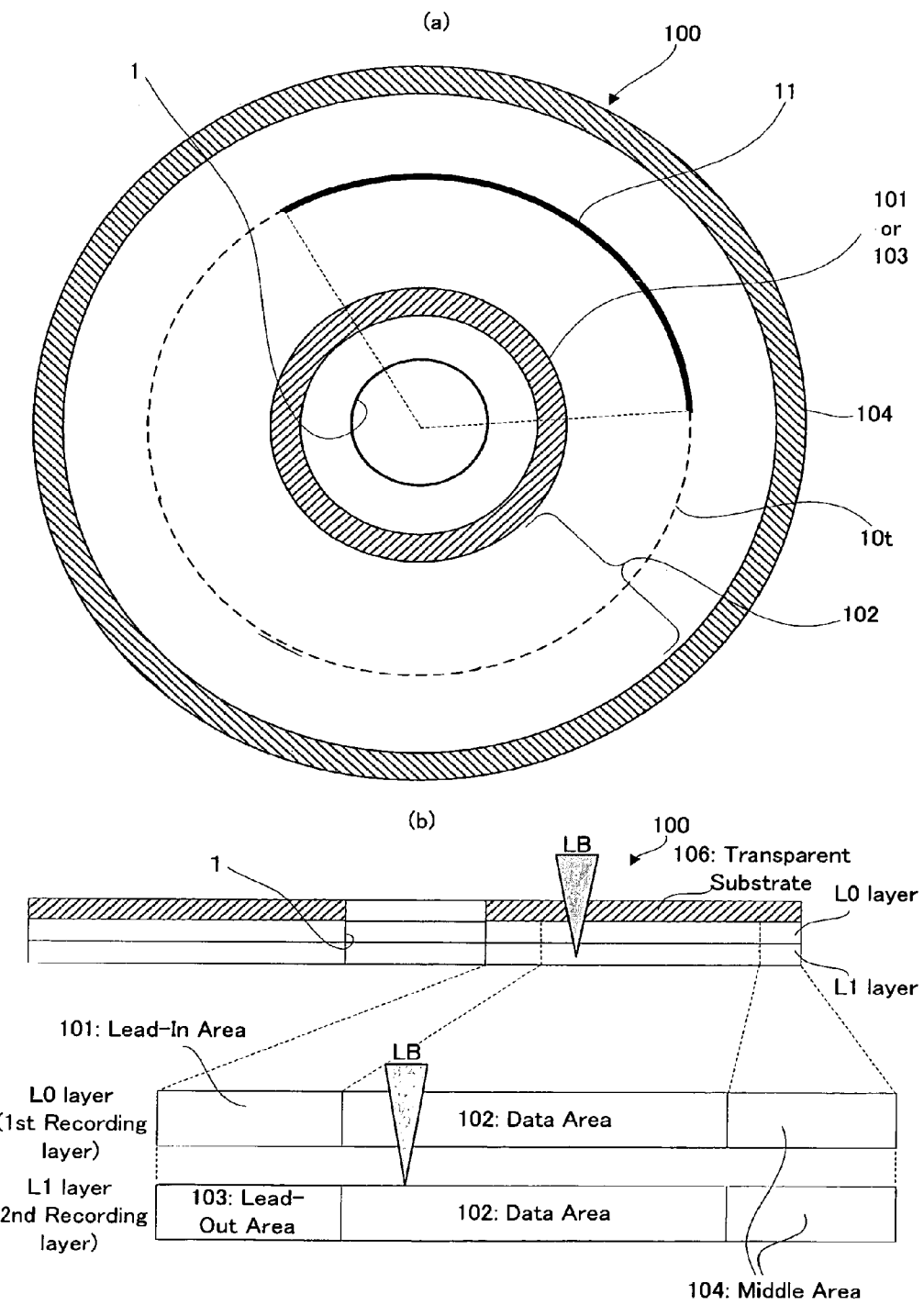

[FIG. 2]
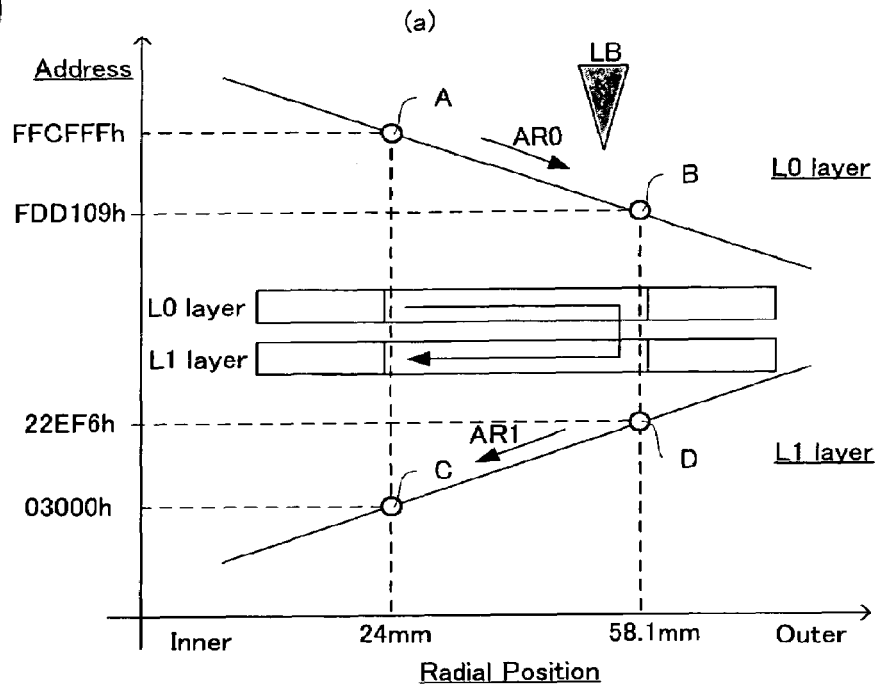
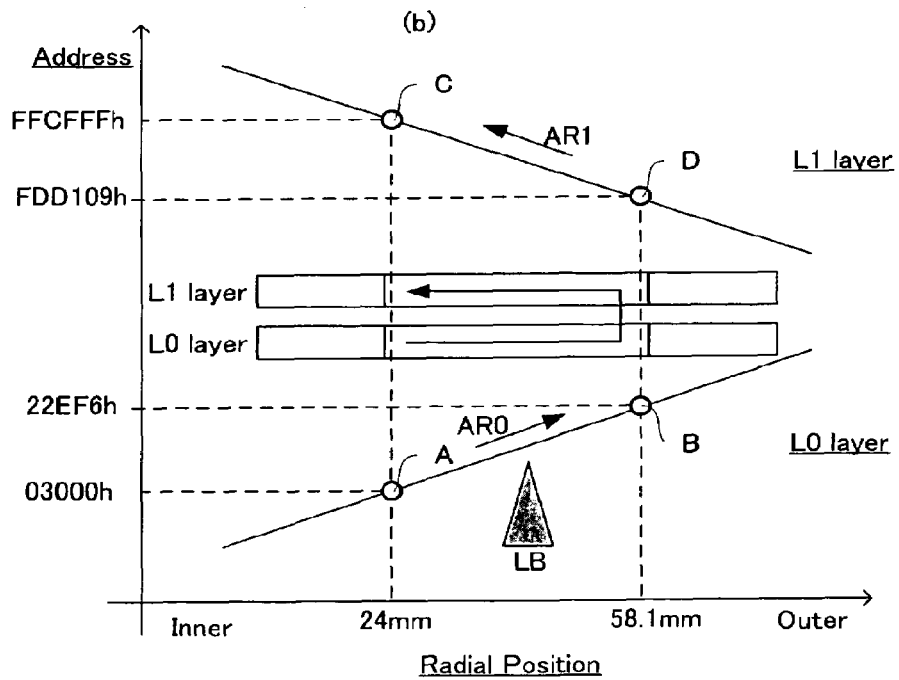

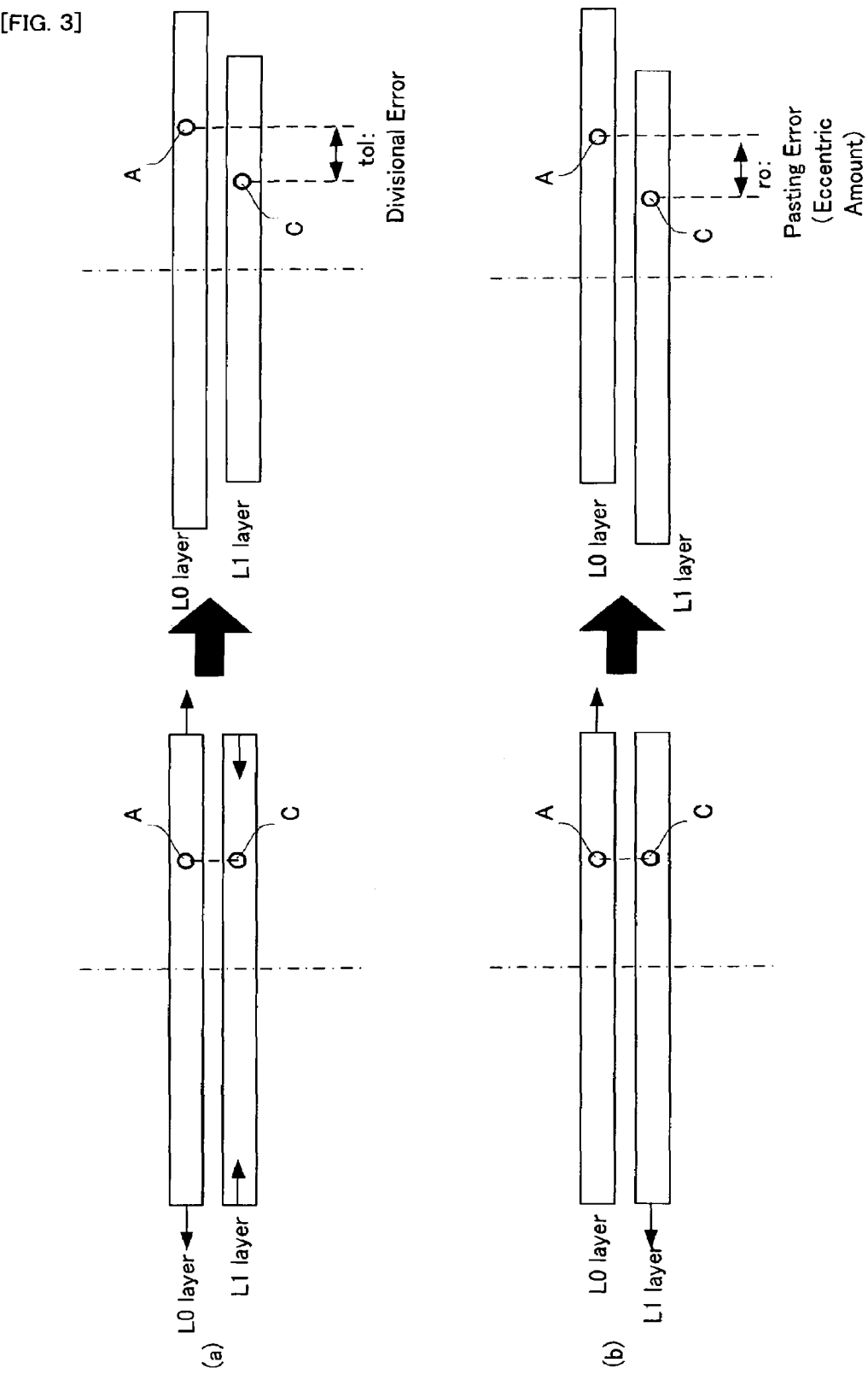

[FIG. 4]
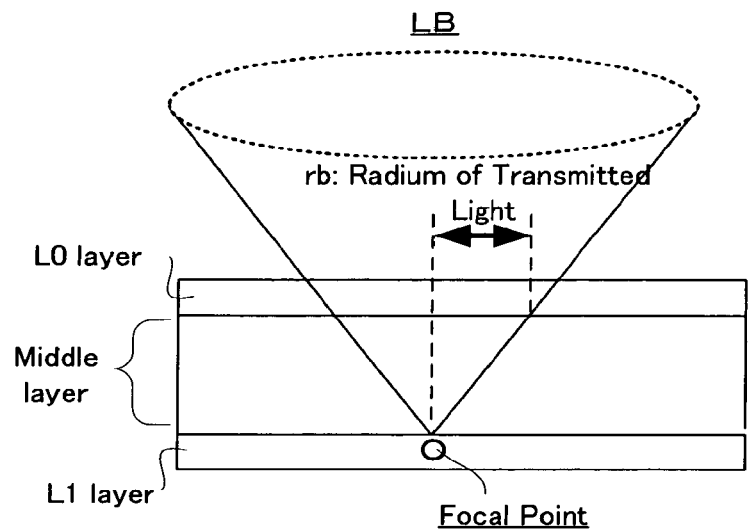
$rb = L \times \tan(\sin^{-1}(NA/n))$

[FIG. 5]
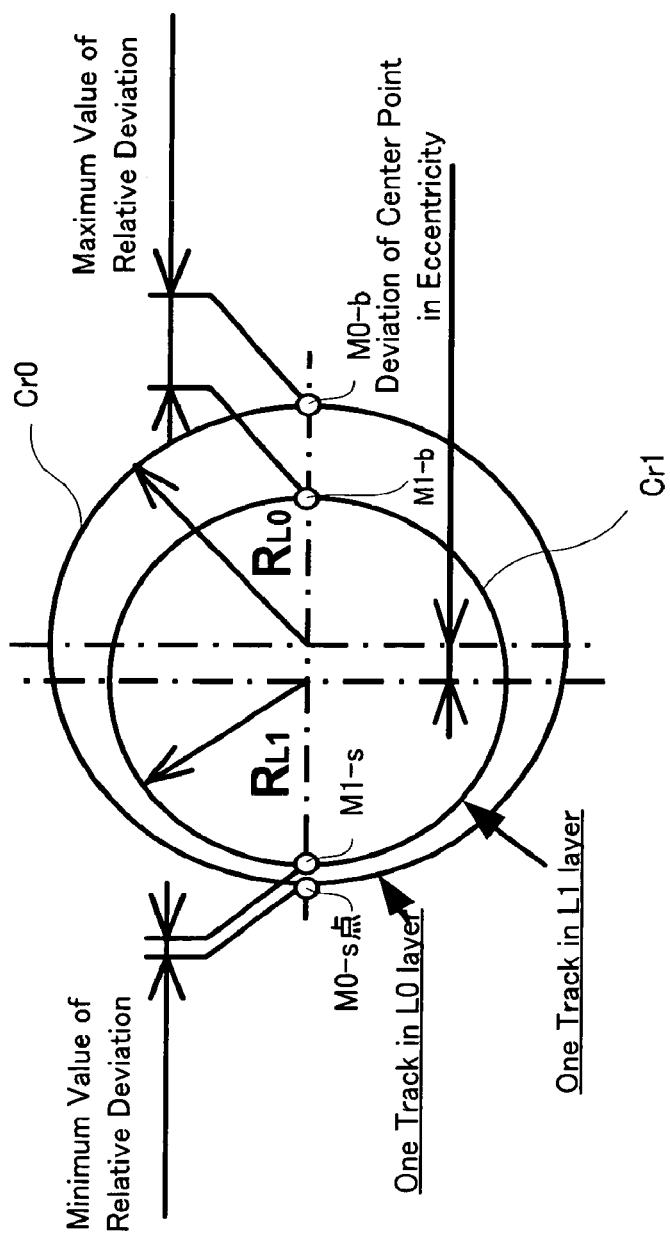

[FIG. 6]
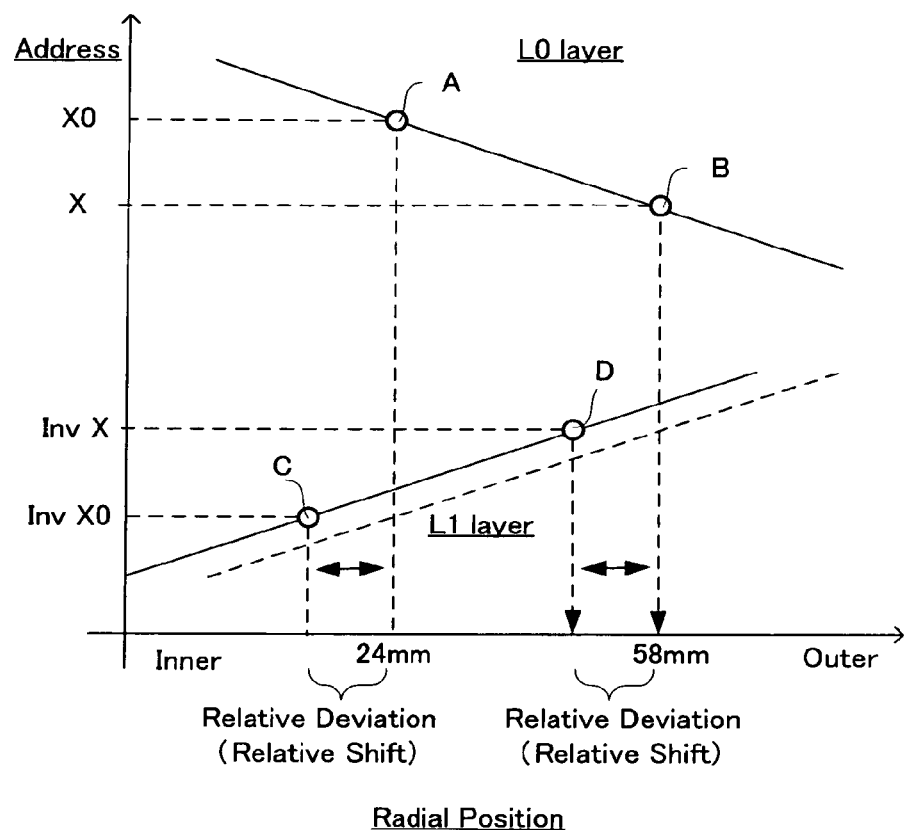

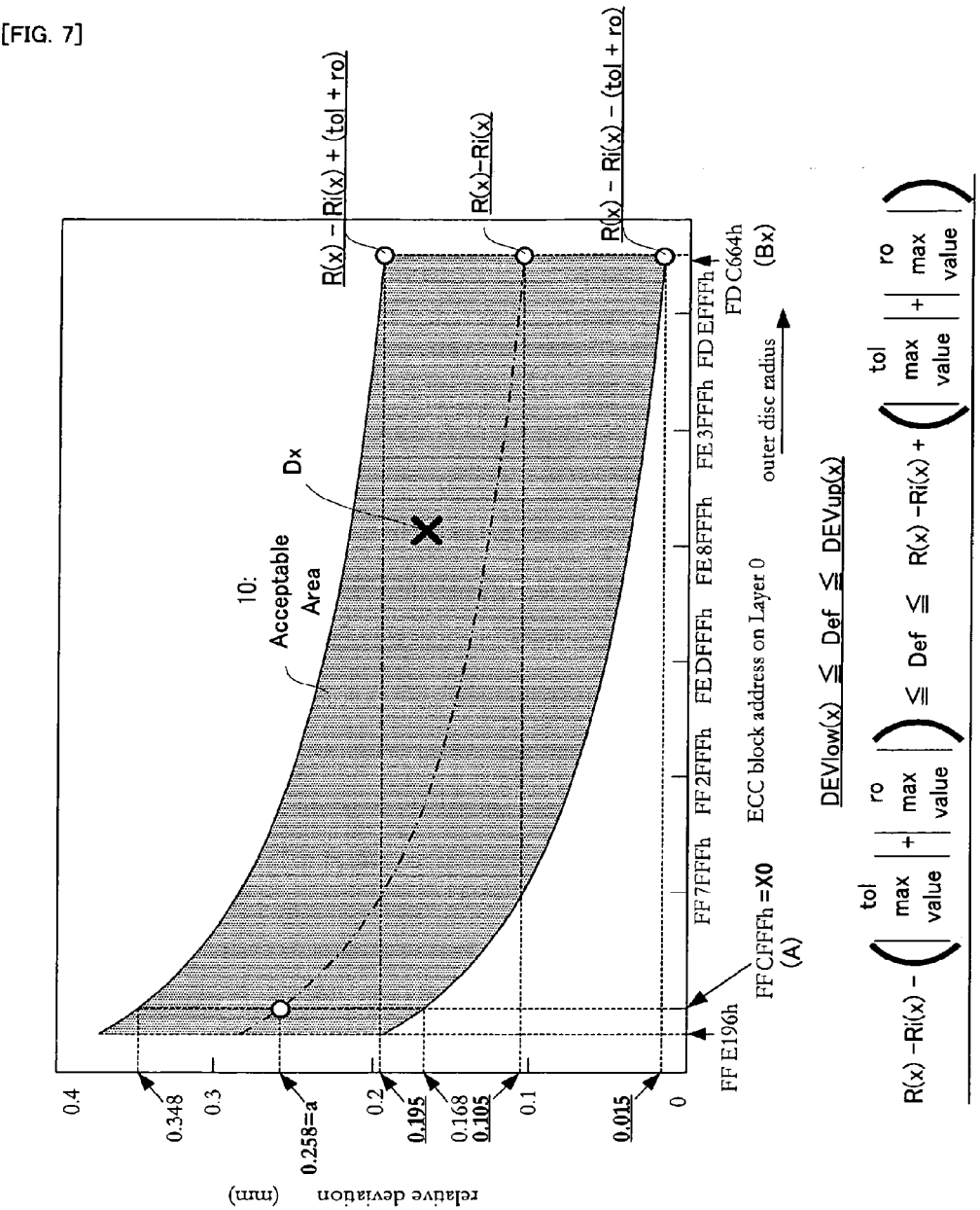

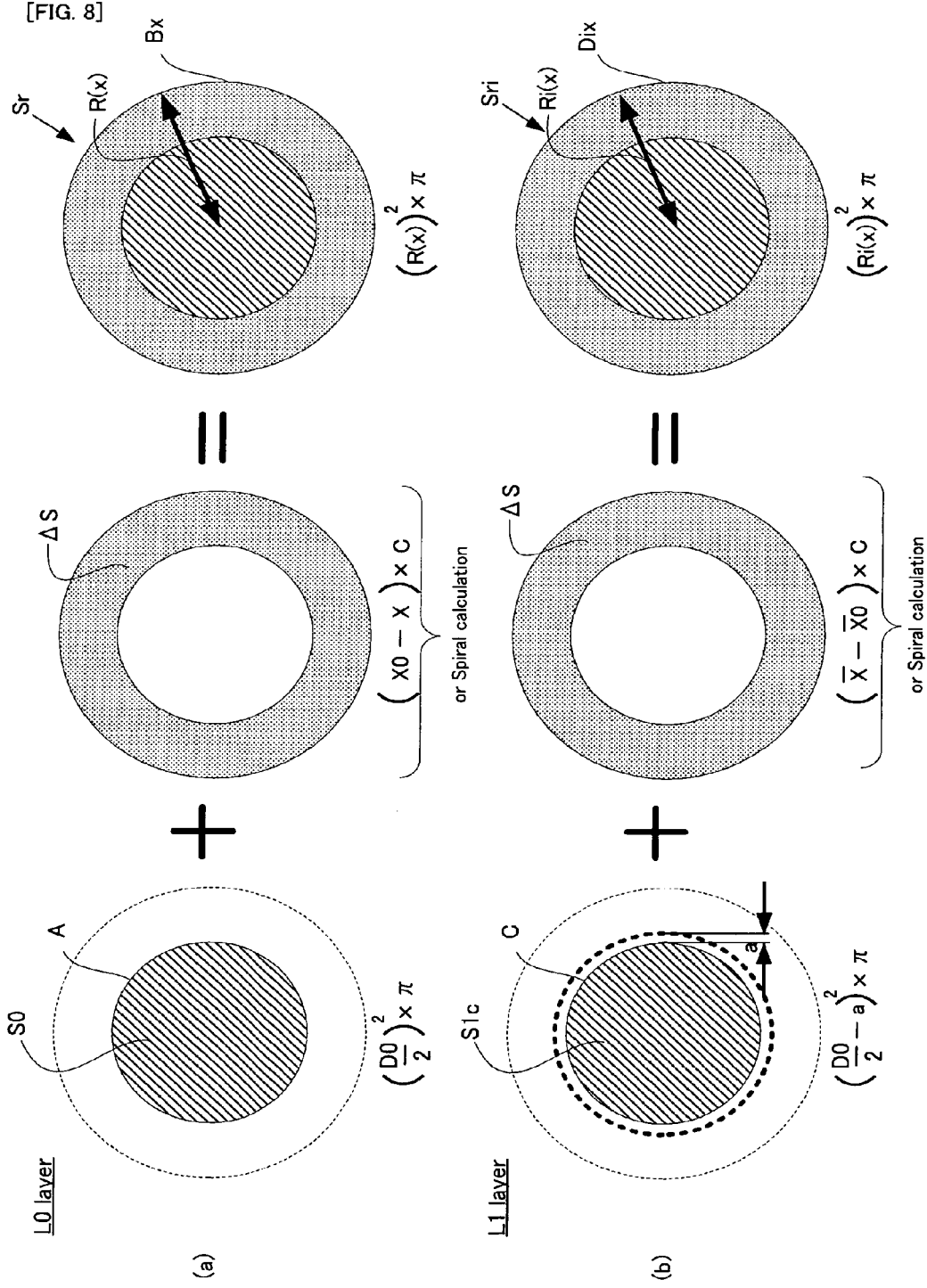

[FIG. 9]
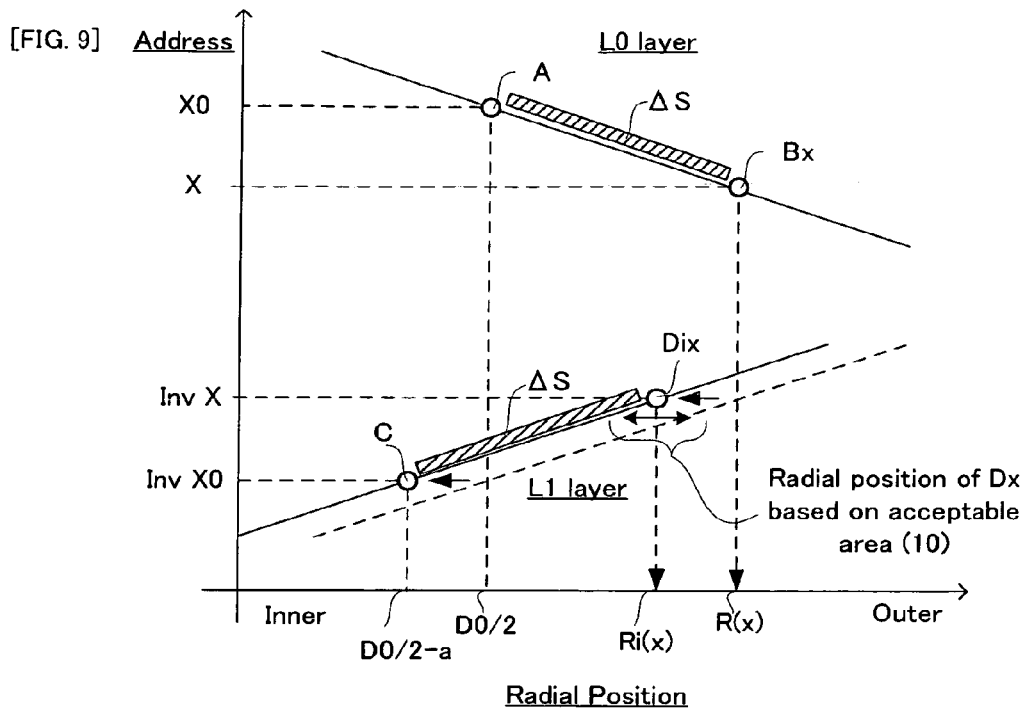
[FIG. 10]
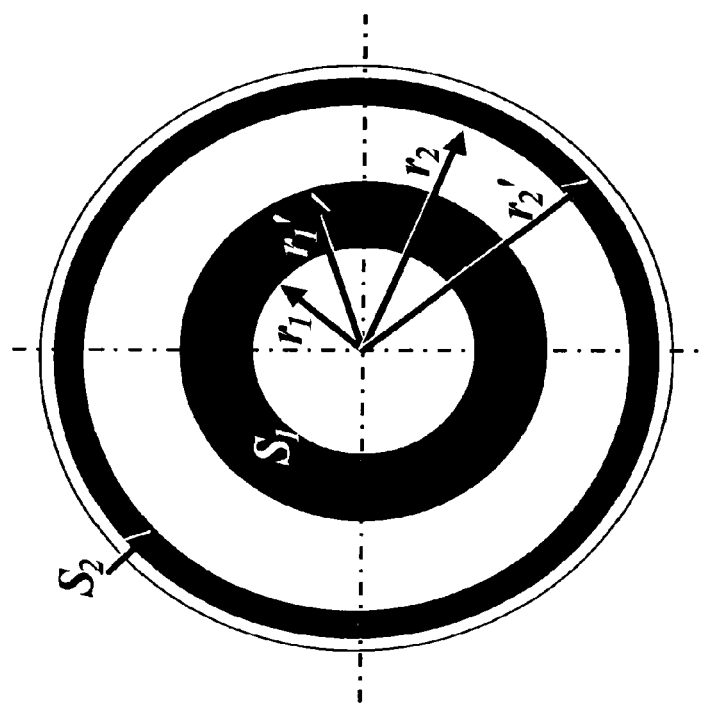

[FIG. 11]
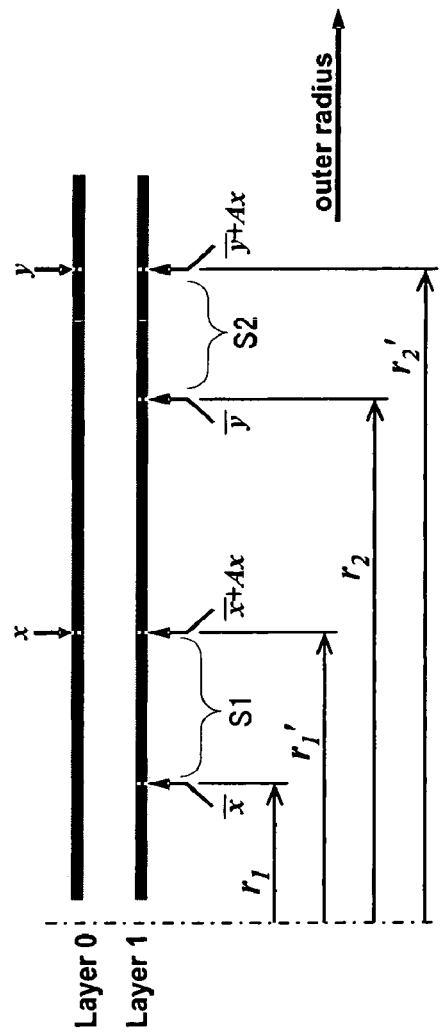

[FIG. 12]
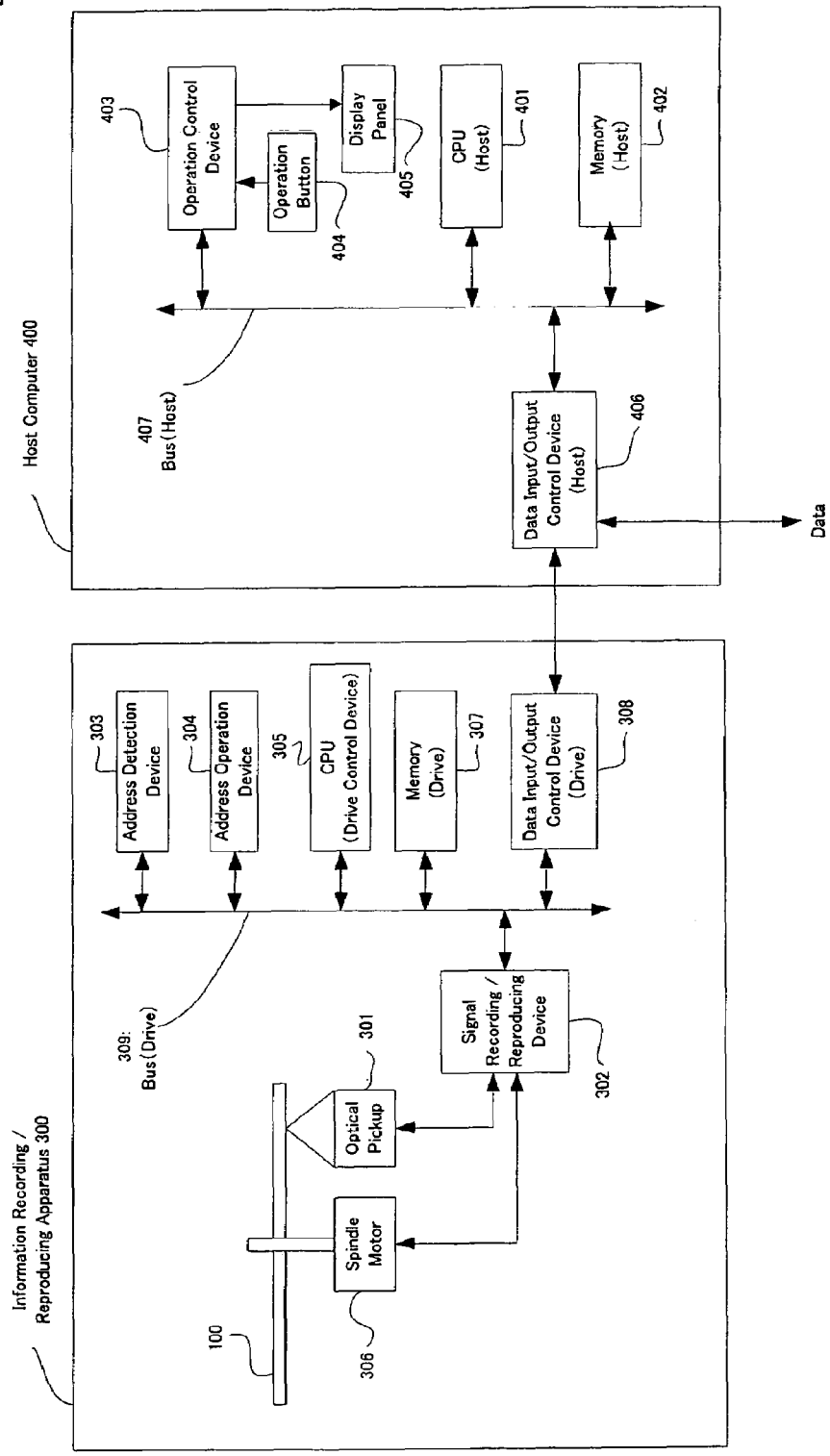

[FIG. 13]
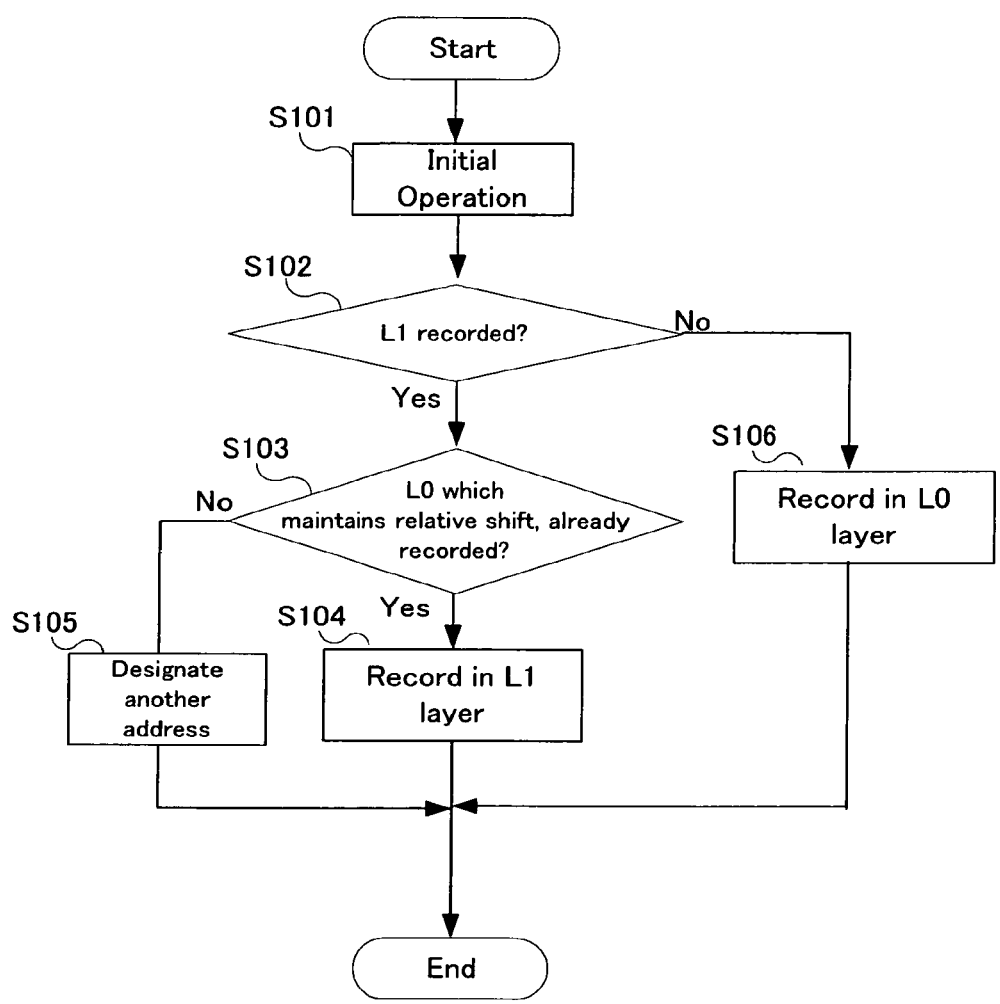

[FIG. 14]
PRIOR ART
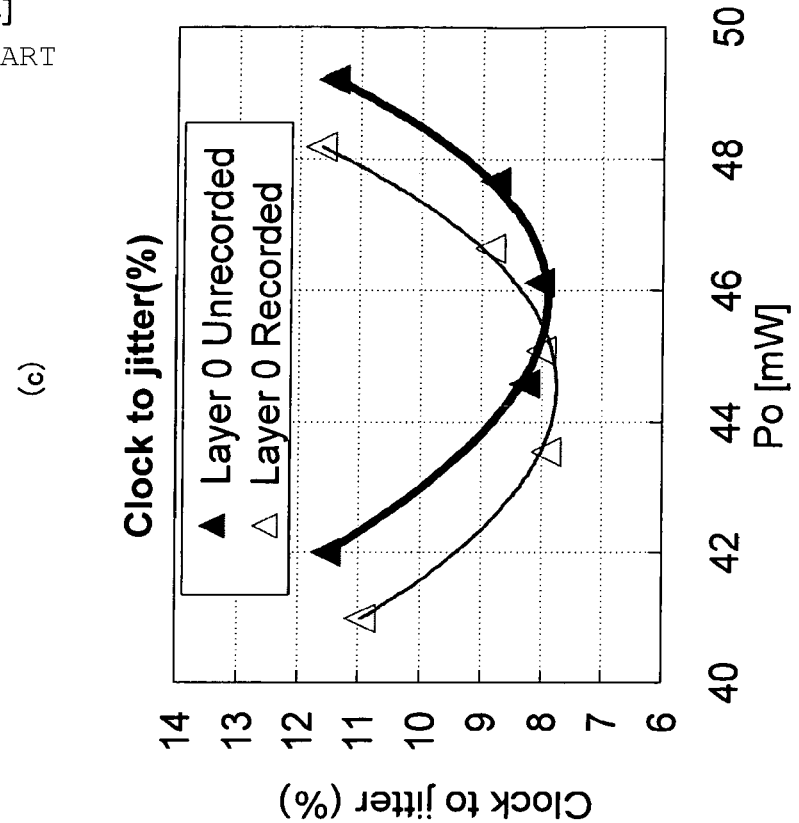
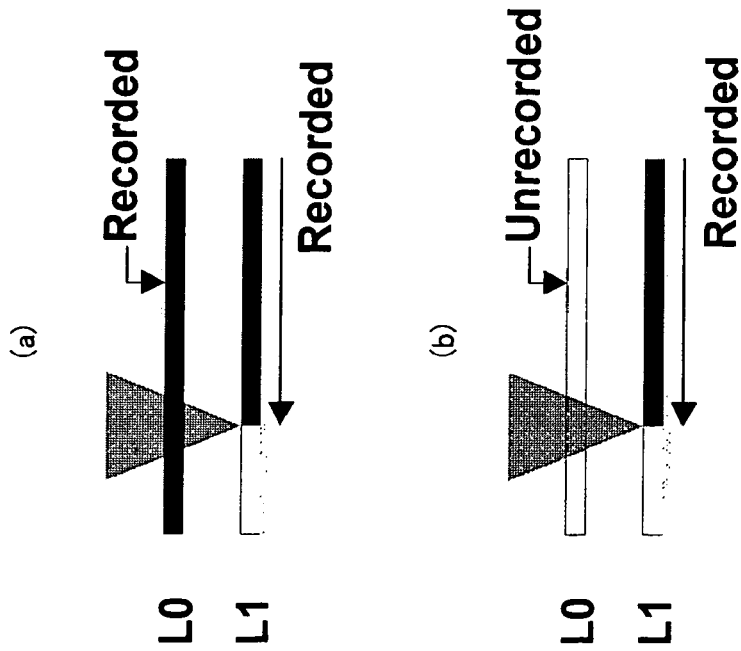

[FIG. 15] PRIOR ART
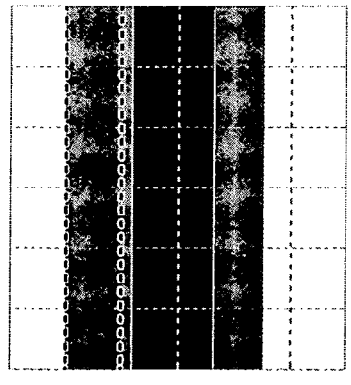
Reproduction HF Waveform
Asymmetry with appropriate value
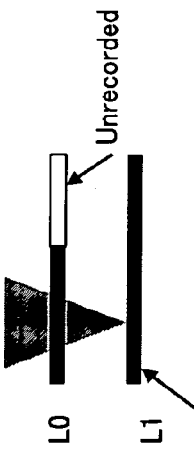
Record through Recorded L0 area
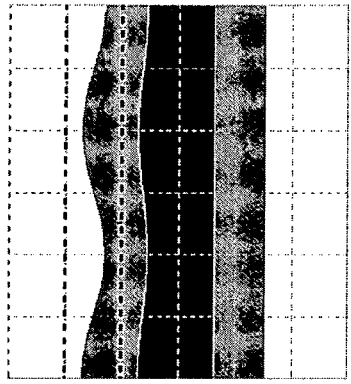
Asymmetry with value changed by influence of eccentricity
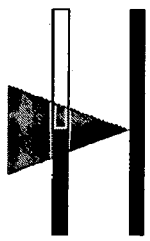
Record through Border of Recorded and Unrecorded Areas
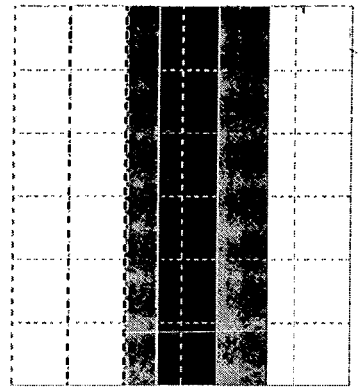
Asymmetry with value lower than appropriate value
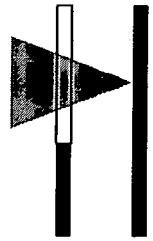
Record through Unrecorded L0 area

EFFICIENT RECORDING OF INFORMATION ON AN INFORMATION RECORDING MEDIUM HAVING A PLURALITY OF LAYERS

TECHNICAL FIELD

The present invention relates to a multilayer type information recording medium, such as a two-layer type DVD and CD (Compact Disc), for example, an information recording apparatus and method, such as a DVD recorder, for recording information onto the information recording medium, and a computer program for recording control.

BACKGROUND ART

In an information recording medium, such as a CD-ROM (Compact Disc-Read Only Memory), a CD-R (Compact Disc-Recordable), a DVD-ROM, a DVD-R, a DVD-RW, and a DVD+R, for example, as described in patent documents 1 and 2, etc., there is also developed an information recording medium, such as a multilayer type or dual layer type optical disc, in which a plurality of recording layers are laminated or pasted on the same substrate. Then, on an information recording apparatus, such as a DVD recorder, for performing the recording with respect to the dual layer type, i.e., two-layer type, optical disc, laser light for recording is focused or condensed on a recording layer located on the front (i.e. on the closer side to an optical pickup) as viewed from the irradiation side of the laser light (hereinafter referred to as an "L0 layer", as occasion demands) to thereby record information into the L0 layer in an irreversible change recording method by heat or a rewritable method. Moreover, the laser light is focused or condensed on a recording layer located on the rear of the L0 layer (i.e. on the farther side from the optical pickup) as viewed from the irradiation side of the laser light (hereinafter referred to as an "L1 layer", as occasion demands), through the L0 layer or the like, to thereby record information into the L1 layer.

When information is recorded into the L1 layer, which constitutes such a two-layer type optical disc, the optimum recording power of the laser light with which the L1 layer is irradiated through the recorded L0 layer, as shown in FIG. 14(a), is 44.5 (mW: milliwatt) at which a jitter value is minimal on a parabolic curve in a thin line (with white triangles) in FIG. 14(c), for example. On the other hand, the optimum recording power of the laser light with which the L1 layer is irradiated through the unrecorded L0 layer which has a different light transmittance from that of the recorded L0 layer, as shown in FIG. 14(b), is 46 (mW: milliwatt) at which a jitter value is minimal on a parabolic curve in a thick line (with black triangles) in FIG. 14(c), for example. Thus, there is a need to consider whether or not the L0 layer is recorded, in the case of the recording in the L1 layer. With respect to this, there is devised or invented a recording method in which a so-called recording order is satisfied, which is that the laser light for recording which has penetrated or transmitted the L0 layer in a recorded state is to be irradiated, for example.

However, in producing such a two-layer type information recording medium, the L0 layer and the L1 layer are formed by different stampas, and are pasted or laminated. Thus, there is a possibility to cause an eccentricity due to a pasting error, in the L0 layer and the L1 layer. Alternatively, since the L0 layer and the L1 layer are formed by different stampas, there likely arises deviation in a track pitch in each recording layer, or there likely arises deviation, a so-called dimensional error or measuring error, in an absolute radial position with respect to a reference address in each recording layer. These cause a shift in the radial position of a recording area in the L1 layer which is associated with or corresponds to a recording area in the L0 layer by address information, such as a pre-format address, for example, and thus there arises a possibility that the above-mentioned recording order is not necessarily satisfied.

More specifically, it is assumed that the recording is performed with a recording power which is optimized in the recording after the penetration of the recorded L0 layer. When the information is recorded into the L1 layer, as shown in the left part of FIG. 15, if the laser light for recording which has penetrated the L0 layer in the recorded state is irradiated on a single track, the amplitude of a reproduction signal becomes large, and good signal quality is obtained. In other words, an asymmetry value, which is one example of the signal quality, is appropriate. On the other hand, as shown in the right part of FIG. 15, if the laser light for recording which has penetrated the L0 layer in an unrecorded state is irradiated, the amplitude of the reproduction signal is small, and good signal quality is not obtained. In other words, the asymmetry value is not appropriate. On the other hand, as shown in the middle part of FIG. 15, if the laser light for recording which has penetrated the L0 layer in which the recorded area and the unrecorded area are mixed is irradiated on a single track, the amplitude of the reproduction signal varies depending on the extent of an eccentric amount. In other words, the asymmetry value transits from one to the other out of the appropriate level and the inappropriate level.

In order to eliminate the deviation of the optimum recording power due to the relative shift, if a recording apparatus detects the recording state of the recording area in the L0 layer which is associated with the recording area in the L1 layer, a recording control process becomes complicated because it is necessary to accurately recognize the above-mentioned relative shift. On the other hand, if the information is recorded in disregard of the deviation of the optimum recording power due to the relative shift, the control becomes complicated; for example, a process parameter for obtaining a binary signal is to be dynamically changed, on a reproducing apparatus for reproducing the recorded information, which increases a load in the reproduction process.

Thus, the inventors of the present invention have devised or invented a method of defining a relationship between an address and a physical radial position in advance, in order not to cause the problem of the deviation of the reproduction quality of the recorded information even if the recording is performed with a constant recording power in the normal case between the L0 layer and the L1 layer. Specifically, the recording medium is prepared such that the radial position in the address system of the L0 layer is located on the inner circumferential side of the radial position in the address system of the L1 layer corresponding to that of the L0 layer.

patent document 1: Japanese Patent Application Laid Open No. 2000-311346 patent document 2: Japanese Patent Application Laid Open No. 2001-23237

DISCLOSURE OF INVENTION

Subject to be Solved by the Invention

However, if a recording operation is performed by the information recording apparatus on the basis of an address offset value, which is determined in order to reduce an influence of the relative shift between the L0 layer and the L1 layer on one side of the outer circumferential side and the inner circumferential side, for example, the address offset value satisfies the recording order beyond necessity on the other side; in other words, a recording area to satisfy the recording order is wasted lengthily, which is a technical problem.

It is therefore an object of the present invention to provide an information recording medium, an information recording apparatus and method, which enable information to be more efficiently recorded, even onto the information recording medium having a plurality of recording layers, for example, as well as a computer program which makes a computer function as the information recording apparatus.

Means for Solving the Subject (Information Recording Medium)

The above object of the present invention can be achieved by an information recording medium provided with: a first recording layer (L0 layer) in which a spiral or concentric first track (which can display a relationship between an address and a radial position in the L0 layer) is formed to record a record information; and a second recording layer (L1 layer) which is irradiated with laser light through the first recording layer and in which a spiral or concentric second track (which can display a relationship between an address and a radial position in the L1 layer) is formed, the second track sharing a rotation center with the first track, wherein the first recording layer has a first point (Bx point) represented by a first address, and the second recording layer has a second point (Dx point) (i) which is represented by a second address corresponding to the first address and (ii) which can be defined on the basis of a predetermined position relationship with respect to the first point (a position relationship in which a dimensional error and an eccentric amount is considered to an ideal position relationship in which a standard eccentric amount a is considered at a UDA starting position).

According to the information recording medium of the present invention, the record information is written along the first track of the first recording layer, for example. Simultaneously or before or after that, the record information is written along the second track of the second recording layer, for example. Specifically, the first track may be directed from one side to the other side out of the inner and outer circumferential sides of a disc-shaped substrate, for example. On the contrary, the second track may be directed from the other side to the one side. In other words, in the two-layer type or multilayer type information recording medium, continuous recording can be performed in an "opposite method" in which tracks for recording are in opposite directions in two recording layers. Therefore, if the recording is continuously performed from the end edge of the first recording layer to the start edge of the second recording layer, it is hardly or not necessary to change at all the irradiation position of the laser light on the substrate surface, in the radial direction, in changing the recording layer targeted for an information recording process or reproduction process. Thus, it is possible to perform quick layer jump (i.e. layer changing operation). This is extremely useful in practice, in the point that it facilitates uninterrupted reproduction without a special buffer function to change the recording layer, in recording the continuous record information, such as a movie, for example.

Alternatively, the first recording track may be directed from one side to the other side out of the above-mentioned inner and outer circumferential sides, and the second recording track may be also directed from the one side to the other side, as in the first recording track. In other words, in the two-layer type or multilayer type information recording medium, the continuous recording can be performed in a "parallel method" in which the recording tracks are in the same direction in the two recording layers. In the parallel method, if the recording or reproduction is ended in the first recording layer, an optical pickup, located on the most outer circumference, needs to be displaced to the most inner circumference again when the recording or reproduction is started in the second recording layer. Thus, as compared to the opposite method described above, it takes more time to change the first recording layer to the second recording layer, by that much.

In particular, the second recording layer in the present invention has the second point (i) which is represented by the second address corresponding to the first address and (ii) which can be defined on the basis of the predetermined position relationship with respect to the first point. The "predetermined position relationship" (or the "predetermined relationship of the position") in the present invention means such a relationship that it is possible to uniquely specify another radial position from one radial position, one-to-one, on the basis of a equation based on a predetermined relationship (or a predetermined relationship equation), a table which indicates the predetermined relationship, or the like. Moreover, the term "corresponding to" in the present invention means that it is possible to uniquely specify another address from one address, one-to-one. Specifically, if one address and another address are in a complement number relationship, it can be said that one address corresponds to another address. More specifically, the first point may face or opposed to the second point. Moreover, the term "face or opposed to" in the present invention may mean that the radial positions are substantially the same and that the radial positions are substantially the same including a predetermined margin or the like.

Therefore, according to the present invention, a difference between the radial position of the first point and the radial position of the second point is defined to be in a predetermined range, from one side to the other side out of the inner and outer circumferential sides, with the address in the first recording layer as a variable (or a variable parameter). Thus, if the recording operation is performed by the information recording apparatus, on the basis of the address offset value, which is determined in order to reduce an influence of the relative shift between the first recording layer and the second recording layer on the outer circumferential side, for example, and which is added to or subtracted from an address for specifying a position in the second recording layer, the address offset value appropriately satisfies the recording order, obviously on the outer circumferential side, and also on the inner circumferential side.

Consequently, in a recording procedure to appropriately satisfy the recording order, the recording area is minimally wasted on the information recording medium of the present invention, and the recording area can be used more efficiently.

In one aspect of the information recording medium of the present invention, a radius of the first point is larger than a radius of the second point.

According to this aspect, the address offset value is defined on the basis of the radius of the first point which is larger than the radius of the second point. Thus if the recording operation is performed by the information recording apparatus, on the basis of the address offset value, the address offset value appropriately satisfies the recording order, obviously on the outer circumferential side, and also on the inner circumferential side.

In another aspect of the information recording medium of the present invention, a value of the second address is bit-inverted by a value of the first address.

According to this aspect, the address offset value is defined on the basis of the value of the second address which is bit-inverted by the value of the first address. Thus if the recording operation is performed by the information recording apparatus, on the basis of the address offset value, the address offset value appropriately satisfies the recording order, obviously on the outer circumferential side, and also on the inner circumferential side.

In another aspect of the information recording medium of the present invention, the predetermined position relationship is expressed by a function with the first address (x) as a variable.

According to this aspect, since the first address in the first recording layer which is firstly irradiated with the laser light is regarded as a reference or a basis, it is possible to define the second point, more plainly.

In another aspect of the information recording medium of the present invention, the predetermined position relationship is expressed by a table with the first address (x) as a parameter at least.

According to this aspect, since the predetermined position relationship is expressed by the table with the first address (x) as a parameter, it is possible to quickly perform various control processes by a manufacturing or producing apparatus, for example, for defining the second point.

In another aspect of the information recording medium of the present invention, the first address (x) is defined on the basis of a predetermined unit (ECC block) which indicates a data amount.

According to this aspect, it is possible to plainly derive a predetermined relationship equation for defining the predetermined position relationship or the like, on the basis of the predetermined unit which indicates the data amount, such as an ECC block.

In another aspect of the information recording medium of the present invention, the predetermined position relationship is set on the basis of a fact that record line densities which indicate a data amount per unit length in the first track and the second track, are numerically designated so as to calculate the record line densities at least in a desired range in recording areas in the first recording layer and the second recording layer.

According to this aspect, it is possible to plainly derive the predetermined relationship equation for defining the predetermined position relationship or the like, on the basis of the area size of the recording area in the first recording layer and the second recording layer on the information recording medium, for example.

In another aspect of the information recording medium of the present invention, the first recording layer has a first reference point (D0/2) represented by a first reference address, the second recording layer has a second reference point (D0/2−a) located at a radial position which is defined on a basis of both the first reference point and a standard radius difference (a) which indicates an error in a standard radial position, and the predetermined position relationship is based on an ideal error (R(x)−Ri(x)), which is a difference between (i) a radial position (R(x)) of the first point and (ii) a radial position (Ri(x)) of a second ideal point represented by a second ideal address, which is theoretically determined by: a difference data amount calculated by the first address and the first reference address; and a second reference address represented by the second reference point.

According to this aspect, it is possible to derive the predetermined relationship equation for defining the predetermined position relationship or the like, plainly and highly accurately, on the basis of the area size of the recording area on an optical disc, for example, and the standard radius difference (a).

In an aspect related to the above-mentioned first point, the first point represented by the first address may be indicated by a predetermined relationship equation which uses (i) the difference data amount which is a difference between the first reference address and the first address and (ii) a value which indicates a record line density in the first recording layer, as a parameter.

By such construction, it is possible to derive the radial position of the first point included in the predetermined relationship equation for defining the predetermined position relationship, more plainly, on the basis of a linear function and spiral integration calculation or the like.

In an aspect related to the above-mentioned second point, the second point represented by the second address is indicated by a predetermined relationship equation which uses (i) the difference data amount which is a difference between the second reference address and the second address and (ii) a value which indicates a record line density in the second recording layer, as a parameter.

By such construction, it is possible to derive the radial position of the second point included in the predetermined relationship equation for defining the predetermined position relationship, more plainly, on the basis of a linear function and spiral integration calculation or the like.

In another aspect of the information recording medium of the present invention, the predetermined position relationship is set so as to include at least one of (i) a dimensional error held by each of the first recording layer and the second recording layer, (ii) an eccentric amount caused by a pasting error in the first recording layer and the second recording layer, and (iii) a radius of transmitted light which indicates a radius of an area formed on said first recording layer in which the laser light is irradiated to penetrate the first recording layer but not to focus on the first recording layer when the laser light is irradiated to focus on the second recording layer.

According to this aspect, it is possible to eliminate an influence of the dimensional error, the eccentric amount, or the radius of transmitted light which may cause the relative shift. Therefore, in the recording operation to appropriately satisfy the recording order, the recording area is minimally wasted on the information recording medium of the present invention, and the recording area can be used more efficiently.

In another aspect of the information recording medium of the present invention, the predetermined position relationship is defined so that a radial position of the second point is in a predetermined range.

According to this aspect, it is possible to define the second point, more strictly, so that the second point is in the predetermined range which is defined by the upper limit and lower limit of an error (or tolerance) in the radial position, for example.

(Information Recording Apparatus)

The information recording apparatus of the present invention will be discussed hereinafter.

The above object of the present invention can be also achieved by an information recording apparatus for recording the record information onto the above-mentioned information recording medium of the present invention (including its various aspects) on which a first recording area can be formed in the first recording layer and a second recording area can be formed in the second recording layer, the information recording apparatus provided with: a recording device capable of recording the record information into the first recording layer and the second recording layer; a calculating device for calculating (i) the second address in the second recording layer corresponding to the first address which is desired in the first recording layer and (ii) a radial position of the second point represented by the second address and a radial position of the first point represented by the first address, with the first address as a parameter; and a controlling device for controlling the recording device to record the record information, while forming the second recording layer, on the basis of at least one of the calculated second address and the calculated radial position of the second point.

According to the information recording apparatus of the present invention, it is possible to know the position relationship between the radial position of the first point, represented by the first address, and the radial position of the second point, represented by the second address corresponding to the first address, plainly and easily. On the basis of the known position relationship, it is possible to record the record information at least at the second point under the recording order which is appropriately satisfied.

Consequently, in the recording operation to appropriately satisfy the recording order, which is performed by the information recording apparatus of the present invention, the recording area is minimally wasted on the information recording medium of the present invention, and the recording area can be used more efficiently.

(Information Recording Method)

The information recording method of the present invention will be discussed hereinafter.

The above object of the present invention can be also achieved by an information recording method in an information recording apparatus provided with a recording device for recording the record information onto the above-mentioned information recording medium of the present invention (including its various aspects) on which a first recording area can be formed in the first recording layer and a second recording area can be formed in the second recording layer, the information recording method provided with: a calculating process of calculating (i) the second address in the second recording layer corresponding to the first address which is desired in the first recording layer and (ii) a radial position of the second point represented by the second address and a radial position of the first point represented by the first address, with the first address as a parameter; and a controlling process of controlling the recording device to record the record information, while forming the second recording layer, on the basis of at least one of the calculated second address and the calculated radial position of the second point.

According to the information recording method of the present invention, it is possible to receive the various benefits owned by the above-mentioned information recording apparatus of the present invention.

Incidentally, in response to the various aspects of the information recording apparatus of the present invention described above, the information recording method of the present invention can adopt various aspects.

(Computer Program)

The computer program of the present invention will be discussed hereinafter.

The above object of the present invention can be also achieved by a computer program of instructions for recording control and for tangibly embodying a program of instructions executable by a computer provided in the above-mentioned information recording apparatus of the present invention (including its various aspects), to make the computer function as at least one portion of the recording device, the calculating device, and the controlling device.

According to the computer program of the present invention, the above-mentioned information recording apparatus of the present invention can be relatively easily realized as a computer reads and executes the computer program from a program storage device, such as a ROM, a CD-ROM, a DVD-ROM, and a hard disk, or as it executes the computer program after downloading the program through a communication device.

Incidentally, in response to the various aspects in the information recording apparatus of the present invention described above, the computer program of the present invention can adopt various aspects.

The above object of the present invention can be also achieved by a computer program product in a computer-readable medium for tangibly embodying a program of instructions executable by a computer provided in the above-mentioned information recording apparatus of the present invention (including its various aspects), to make the computer function as at least one portion of the recording device, the calculating device, and the controlling device.

According to the computer program product of the present invention, the above-mentioned information recording apparatus can be embodied relatively readily, by loading the computer program product from a recording medium for storing the computer program product, such as a ROM (Read Only Memory), a CD-ROM (Compact Disc-Read Only Memory), a DVD-ROM (DVD Read Only Memory), a hard disk or the like, into the computer, or by downloading the computer program product, which may be a carrier wave, into the computer via a communication device. More specifically, the computer program product may include computer readable codes to cause the computer (or may comprise computer readable instructions for causing the computer) to function as the above-mentioned information recording apparatus.

The nature, utility, and further features of this invention will be more clearly apparent from the following detailed description with reference to preferred embodiments of the invention when read in conjunction with the accompanying drawings briefly described below.

As explained above, according to the information recording medium of the present invention, it is provided with: the first recording layer having the first point; and the second recording layer having the second point which can be defined on the basis of the predetermined position relationship with respect to the first point. Therefore, in the recording procedure to appropriately satisfy the recording order, the recording area is minimally wasted on the information recording medium of the present invention, and the recording area can be used more efficiently.

Moreover, according to the information recording apparatus of the present invention, it is provided with: the recording device; the calculating device; and the controlling device. According to the information recording method of the present invention, it is provided with: the calculating process; and the controlling process. Therefore, in the recording operation to appropriately satisfy the recording order, the recording area is minimally wasted on the information recording medium of the present invention, and the recording area can be used more efficiently.

Moreover, according to the computer program of the present invention, it makes a computer function as the above-mentioned information recording apparatus of the present invention, so that it enables the information recording apparatus to minimize a waste of the recording area on the information recording medium and to use the recording area more efficiently.

BRIEF DESCRIPTION OF DRAWINGS

FIG. 1 are a substantial plan view (FIG. 1(a)) showing the basic structure of an optical disc having a plurality of recording areas, in an embodiment of the information recording medium of the present invention, and a schematic cross sectional view of the optical disc and a corresponding conceptual view (FIG. 1(b)) showing a recording area structure in the radial direction.

FIG. 2 are a graph (FIG. 2(a)) showing one specific example of a relationship between an address and a radial position in an L0 layer and an L1 layer, which are related to the first recording layer and the second recording layer of the present invention, respectively, and a graph (FIG. 2(b)) showing another specific example.

FIG. 3 are a schematic diagram (FIG. 3(a)) conceptually showing a dimensional error held by each of the L0 layer and the L1 layer, which are respectively related to the first recording layer and the second recording layer of the present invention, and a schematic diagram (FIG. 3(b)) conceptually showing an eccentric amount caused by a pasting error in the L0 layer and the L1 layer.

FIG. 4 is a schematic diagram conceptually showing an irradiation position error between an irradiation position where laser light is irradiated in the L1 layer, which is related to the second recording layer, and an irradiation position where the laser light is irradiated in the L0 layer, which is related to the first recording layer.

FIG. 5 is a schematic plan view showing a position relationship between one track in the L0 layer and another track in the L1 layer corresponding to the one track, in the case where there arise the dimensional error, the pasting error (eccentric amount), and the irradiation position error in the L0 layer and the L1 layer, which are respectively related to the first recording layer and the second recording layer of the present invention.

FIG. 6 is a graph showing one specific example of the relationship between the address and the radial position in the case where there arises at least one of the dimensional error, the pasting error (eccentric amount), and the irradiation position error in the L0 layer and the L1 layer, which are respectively related to the first recording layer and the second recording layer of the present invention.

FIG. 7 is a graph showing a relationship between (i) an address (x) in the L0 layer related to the first recording layer of the present invention and (ii) an ideal error (R(x)−Ri(x)) which includes the dimensional error and the eccentric amount and which is a difference between the radial position (R(x)) of a first point (Bx point) in the L0 layer and the radial position (Ri(x)) of an ideal point (Dix point) represented by an ideal address which is theoretically determined in the L1 layer corresponding to the first point (Bx point).

FIG. 8 are a conceptual view (FIG. 8(a)) showing a procedure of calculating the radial position (R(x)) of the first point "Bx point" in the L0 layer related to the first recording layer, and a conceptual view (FIG. 8(b)) showing a procedure of calculating the radial position (Ri(x)) of the ideal point "Dix point" represented by the ideal address which is theoretically determined in the L1 layer related to the second recording layer.

FIG. 9 is a graph showing a relationship between the radial position (R(x)) of the first point in the L0 layer related to the first recording layer of the present invention and the radial position (Ri(x)) of the ideal point represented by the ideal address which is theoretically determined in the L1 layer related to the second recording layer.

FIG. 10 is a plan view of an optical disc schematically showing a recording area "S1" in a thick donut-shaped on the inner circumferential side and a recording area "S2" in a thin donut-shaped on the outer circumferential side, which correspond to a constant address offset value, in general.

FIG. 11 is a cross sectional view schematically showing a length in the radial direction of the recording area shown in FIG. 10.

FIG. 12 is a block diagram showing the basic structures of an information recording/reproducing apparatus in an embodiment of the information recording apparatus of the present invention, and a host computer.

FIG. 13 is a flowchart showing a recording operation by the information recording/reproducing apparatus, according to the embodiment of the information recording apparatus of the present invention.

FIG. 14 are schematic diagrams (FIG. 14(a) and FIG. 14(b)) conceptually showing the recording order of the present invention, and a graph (FIG. 14(c)) numerically showing the recording order.

FIG. 15 is a schematic diagram and a graph group showing problems in a comparison example.

DESCRIPTION OF REFERENCE CODES

10 Acceptable area
100 Optical disc
101 Lead-in area
102 Data area
103 Lead-out area
104 Middle area
300 Information recording/reproducing apparatus
LB Laser light

BEST MODE FOR CARRYING OUT THE INVENTION

Hereinafter, the best mode for carrying out the invention will be explained in each embodiment in order, with reference to the drawings.

(1) Information Recording Medium

At first, with reference to FIG. 1 to FIG. 12, the embodiment of the information recording medium of the present invention will be discussed in detail. Incidentally, in an optical disc in the embodiment, an opposite method is applied, as one specific example of a recording method, in which the track path of the L0 layer which constitutes one example of the "first track" of the present invention and the track path of the L1 layer which constitutes one example of the "second track" of the present invention have opposite recording directions. Moreover, it is obvious that a parallel method may be also applied in the embodiment.

Particularly in the embodiment, an explanation will be given on the basis of the fact that one track (one circle) is specified by one address, as described later.

(1-1) Basic Structure

At first, with reference to FIG. 1(a) and FIG. 1(b), the basic structure of an optical disc according to the embodiment of the recording medium of the present invention will be discussed. FIG. 1(a) is a substantial plan view showing the basic structure of an optical disc having a plurality of recording areas in the embodiments of the information recording medium of the present invention, and FIG. 1(b) is a schematic cross sectional view of the optical disc and a corresponding conceptual diagram showing a recording area structure in the radial direction.

As shown in FIG. 1(a) and FIG. 1(b), an optical disc 100 has a recording surface on a disc main body with a diameter of about 12 cm, as is a DVD. On the recording surface, the optical disc 100 is provided with: a lead-in area 101 or a lead-out area 103; a data area 102; and a middle area 104, with a center hole 1 as the center. Then, for example, on a transparent substrate 106 of the optical disc 100, there are laminated recording layers, such as an L0 layer and an L1 layer. In each recording area of the recording layers, tracks 10, such as groove tracks and land tracks, are alternately placed, spirally or concentrically, with the center hole 1 as the center. On the track 10, data is divided and recorded by a unit of ECC block 11. The ECC block 11 is a data management unit by which record information is error-correctable.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

The optical disc 100 in the embodiment, as shown in FIG. 1(b), has such a structure that the L0 layer and the L1 layer, which constitute one example of the "first and second record layers" of the present invention as descried later, respectively, are laminated on the transparent substrate 106. Upon the recording/reproduction of such a two-layer type optical disc 100, the recording/reproduction in the L0 layer or the L1 layer is performed, depending on which recording layer has the focus position of laser light LB, irradiated from the upper side to the lower side in FIG. 1(b). Moreover, the optical disc 100 in the embodiment is not limited to a two-layer single sided type, i.e., a dual layer type, but may be a two-layer double sided type, i.e., a dual layer double sided type. Furthermore, the optical disc 100 in the embodiment is not limited to the optical disc having the two recording layers, as described above, but may be an optical disc of a multilayer type which has three or more layers.

Incidentally, a recording/reproducing procedure in the opposite method on the two-layer type optical disc and the like will be discussed later.

(1-2) Address and Radial Position

Next, with reference to FIG. 2, an address and a radial position on a two-layer type optical disc according to the embodiment of the information recording medium of the present invention will be discussed. FIG. 2 are a graph (FIG. 2(a)) showing one specific example of a relationship between the address and the radial position in the L0 layer and the L1 layer, which are related to the first recording layer and the second recording layer of the present invention, respectively, and a graph (FIG. 2(b)) showing another specific example.

As shown in FIG. 2(a) and FIG. 2(b), in one and another specific examples of the relationship between the address and the radial position in the L0 layer and the L1 layer, which are related to the first recording layer and the second recording layer of the present invention, respectively, the relationship between the address and the radial position is defined on the basis of the opposite method. The opposite method herein is, more specifically, such a method that the optical pickup of an information recording/reproducing apparatus described later is displaced from the inner to the outer circumferential side, i.e. in the right direction of an arrow AR0 in FIG. 2(a) and FIG. 2(b), in the L0 layer as the recording or reproducing procedure of the two-layer type optical disc, while the optical pickup is displaced from the outer to the inner circumferential side, i.e. in the left direction of an arrow AR1 in FIG. 2(a) and FIG. 2(b), in the L1 layer, to thereby perform the recording or reproduction on the two-layer type optical disc. In the opposite method, if the recording or reproduction is ended in the L0 layer, the optical pickup, located on the most outer circumference, does not need to be displaced again to the most inner circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel method. This is why the opposite method is broadly adopted in the recording of large volumes of content information.

(1-2-1) Decreasing Address and Radial Position

In one specific example of the relationship between the address and the radial position in the L0 layer and the L1 layer, which are related to the first recording layer and the second recording layer of the present invention, respectively, the address decreases in an address system based on the above-mentioned opposite method. Incidentally, in one specific example, the laser light LB is irradiated from the upper side to the lower side, and the transit of the address in the L0 layer is illustrated in a straight line in the upper part, and the transit of the address in the L1 layer is illustrated in a straight line in the lower part.

Specifically, as shown in FIG. 2(a), at first, in the L0 layer, as the laser light irradiated from the optical pickup is displaced in the lead-in area 101-0, the data area 102-0, and the middle area 104-0, from the inner to the outer circumferential side, the address in the recording area of the optical disc 100 decreases. More specifically, the focal point of the laser light is displaced to the outer circumferential side from the start position (an A point in FIG. 2(a)) of the data area 102-0 in the L0 layer with an address of "FFCFFFh" (expressed in hexadecimal numeral) and at a radial position of "24 (mm)". Then, the focal point of the laser light is displaced to the end position (a B point in FIG. 2(a)) of the data area 102-0 in the L0 layer with an address of "FDD109h" and at a radial position of "58.1 (mm)", to thereby record or reproduce the information recorded in the data area 102-0 in the L0 layer.

On the other hand, in the L1 layer, the laser light is displaced in the middle area 104-1, the data area 102-1, and the lead-out area 103-1 from the outer to the inner circumferential side, the address in the recording area of the optical disc 100 decreases. More specifically, the focal point of the laser light is displaced to the inner circumferential side from the start position (a D point in FIG. 2(a)) of the data area 102-1 in the L1 layer with an address of "22EF6h" and at a radial position of "58.1 (mm)". Then, the focal point of the laser light is displaced to the end position (a C point in FIG. 2(a)) of the data area 102-1 in the L1 layer with an address of "03000h" and at a radial position of "24 (mm)", to thereby record or reproduce the information recorded in the data area 102-1 in the L1 layer.

(1-2-2) Increasing Address and Radial Position

In another specific example of the relationship between the address and the radial position in the L0 layer and the L1 layer, which are related to the first recording layer and the second recording layer of the present invention, respectively, the address increases in the address system based on the above-mentioned opposite method. Incidentally, in another specific example, the laser light LB is irradiated from the lower side to the upper side, and the transit of the address in the L0 layer is illustrated in a straight line in the lower part, and the transit of the address in the L1 layer is illustrated in a straight line in the upper part.

Specifically, as shown in FIG. 2(b), at first, in the L0 layer, as the laser light irradiated from the optical pickup is displaced in the lead-in area 101-0, the data area 102-0, and the middle area 104-0, from the inner to the outer circumferential side, the address in the recording area of the optical disc 100 increases. More specifically, the focal point of the laser light is displaced to the outer circumferential side from the start position (an A point in FIG. 2(*b*)) of the data area 102-0 in the L0 layer with an address of "03000h" and at a radial position of "24 (mm)". Then, the focal point of the laser light is displaced to the end position (a B point in FIG. 2(*b*)) of the data area 102-0 in the L0 layer with an address of "22EF6h" and at a radial position of "58.1 (mm)", to thereby record or reproduce the information recorded in the data area 102-0 in the L0 layer.

On the other hand, in the L1 layer, the laser light is displaced in the middle area 104-1, the data area 102-1, and the lead-out area 103-1 from the outer to the inner circumferential side, the address in the recording area of the optical disc 100 increases. More specifically, the focal point of the laser light is displaced to the inner circumferential side from the start position (a D point in FIG. 2(*b*)) of the data area 102-1 in the L1 layer with an address of "FDD109h" and at a radial position of "58.1 (mm)". Then, the focal point of the laser light is displaced to the end position (a C point in FIG. 2(*b*)) of the data area 102-1 in the L1 layer with an address of "FFCFFFh" and at a radial position of "24 (mm)", to thereby record or reproduce the information recorded in the data area 102-1 in the L1 layer.

The value of the address at a point at one radial position in the L0 layer, related to the first recording layer of the present invention, and the value of the address at a point at one radial position the L1 layer, related to the second recording layer of the present invention, have such a relationship that bits are inverted to each other, i.e. a complement number relationship. Moreover, in the present invention, the complement number relationship is defined by a function of "Inv(x)" which indicates a complement number, as described later. Moreover, as one specific example of the address in the L0 layer and the L1 layer, an ECC block address, which is used as a land pre pit (LPP) address, for example, is applied; however, it is obvious that a so-called sector number may be applied.

(1-3) Relative Shift

Next, three types of specific examples of a relative shift caused on the two-layer type optical disc provided with the L0 layer and the L1 layer, which are related to the first recording layer and the second recording layer of the present invention, respectively, will be discussed with reference to FIG. 3 and FIG. 4. FIG. 3 are a schematic diagram (FIG. 3(*a*)) conceptually showing a dimensional error held by each of the L0 layer and the L1 layer, which are related to the first recording layer and the second recording layer of the present invention, and a schematic diagram (FIG. 3(*b*)) conceptually showing an eccentric amount caused on the basis of a pasting error in the L0 layer and the L1 layer. FIG. 4 is a schematic diagram conceptually showing the radius of an area in which laser light is irradiated (irradiation area) to penetrate the L0 layer but not to focus on the L0 layer, which is related to the first recording layer of the present invention, when the laser light is irradiated to focus on the L1 layer, which is related to the second recording layer of the present invention.

At first, with reference to FIG. 3, the "dimensional error (or measuring error)" and the "eccentric amount" of the present invention will be discussed.

(1-3-1) Dimensional Error

As shown in FIG. 3(*a*), each of the L0 layer and the L1 layer, which constitute the two-layer type optical disc, holds the dimensional error, as the relative shift. The "dimensional error" herein is an error between the address and the radial position held by each of the L0 layer and the L1 layer independently of each other, and it is an amount caused as the deviation between an absolute radial position at a reference address in the L0 layer and an absolute radial position at a reference address in the L1 layer, when the L0 layer and the L1 layer are pasted.

Specifically, the dimensional error is caused by each of the various processes which constitute a manufacturing process. In other words, the L0 layer and the L1 layer are manufactured by the injection molding of resin materials in a stampa which is prepared on the basis of an original disc produced by a cutting machine. Therefore, (i) there is a possibility that the original disc itself holds a radial error due to the error of the radial position of the cutting machine and the variations of the track pitch, or the like, in producing the original disc. (ii) There is a possibility that the individual difference of the optical disc other than its acceptable range or tolerance may be the radial error in thermal contraction upon the injection molding. (iii) Since the L0 layer and the L1 layer are separately prepared by different stampas, there is a possibility that the deviation of a track pitch in each recording layer may be included.

Specifically, a dimensional error tol is expressed by a difference between (i) the radial position of the start position (A point) of the data area 102-0 in the L0 layer with the address of "FFCFFFh", shown in FIG. 2 described above, and (ii) the radial position of the end position (C point) of the data area 102-1 in the L1 layer with the address of "03000h" and at the radial position of "24 mm". Then, the acceptable range or tolerance of the dimensional error tol is equal to or less than "20 μm" in the positive direction or in the negative direction, in the L0 layer, and it is also equal to or less than "20 μm" in the positive direction or in the negative direction, in the L1 layer. Thus, that means it is allowed to hold the tolerance by "40 μm" in total, in each individual of the two-layer type optical disc.

(1-3-2) Pasting Error (Eccentric Amount)

As shown in FIG. 3(*b*), in the two-layer type optical disc, there is a possibility that an eccentric amount due to an error in pasting the L0 layer and the L1 layer, i.e. a so-called pasting error, is caused, as the relative shift. The "eccentric amount" herein is unrelated to the dimensional error held by each of the L0 layer and the L1 layer, and it is an amount caused as the deviation between an absolute radial position at a reference address in the L0 layer and an absolute radial position at a reference address in the L1 layer, when the L0 layer and the L1 layer are pasted.

Specifically, an eccentric amount ro is expressed by a difference between the radial position of the start position (A point) of the data area 102-0 in the L0 layer with the address of "FFCFFFh", shown in FIG. 2 described above, and the radial position of the end position (C point) of the data area 102-1 in the L1 layer with the address of "03000h" and at the radial position of "24 mm". Then, the acceptable range or tolerance of the eccentric amount ro is equal to or less than "20 μm" in the positive direction or in the negative direction, in the L0 layer, and it is equal to or less than "30 μm" in the positive direction or in the negative direction, in the L1 layer. That means it is allowed to hold it by "50 μm" in total, in each individual of the two-layer type optical disc.

As a result, it can be said that there is a possibility that the deviation between the absolute radial position at the reference address in the L0 layer and the absolute radial position at the reference address in the L1 layer, may take a value of "90 μm" in the positive direction or in the negative direction, on the basis of the two types of relative shifts caused on the two-layer type optical disc provided with the L0 layer and the L1 layer described above. Therefore, it can be said that there is a possibility that the deviation may vary in a range which holds a value of "180 μm" as a maximum value.

(1-3-3) Radius of Transmitted Light

As shown in FIG. 4, the "radius of transmitted light" of the present invention will be discussed.

As shown in FIG. 4, in the two-layer type optical disc, there is a possibility that the radius of transmitted light rb may be caused by the fact that the beam shape of the laser light is a cone. The "radius of transmitted light" herein is a radius of an area (irradiation area) in which the laser light is irradiated to penetrate the L0 layer but not to focus (i.e. defocus) on the L0 layer when the laser light is irradiated to focus on the L1 layer.

Specifically, the maximum value of the radius of transmitted light rb is expressed by the following equation (10).

$$rb = L \times \tan<\sin-1(NA/n)> \quad (10)$$

wherein,

L: thickness of a middle layer (a layer inserted between the L0 layer and the L1 layer)

NA: numerical aperture in optical system n: refractive index

Incidentally, in the present invention, "sin−1" is a reverse function of "sin".

More specifically, as one specific example of the maximum value of the radius of transmitted light rb, a value of "34 μm" may be calculated on the basis of (i) the numerical aperture (NA) of the laser light, (ii) the refractive index of the middle area which exists between the L0 layer and the L1 layer, and (iii) the thickness of the middle area which determines the interlayer distance of the L0 layer and the L1 layer.

Then, it is necessary to consider the influence of the radius of transmitted light rb in performing the recording or reproduction. Specifically, in order to obtain better recording signal features (or reproduction quality), the recording is to be performed away from the radius of transmitted light rb.

As a result, it is necessary to consider the relative deviation which holds a value of "90 μm", for example, and the radius of transmitted light rb which holds a value of "34 μm", for example, in the positive direction or the negative direction, in actual recording.

(1-4) Relationship Between Address and Radial Position Including Relative Shift

Next, an explanation will be given to a specific example in the case where there arise three types of relative shifts caused on the two-layer type optical disc provided with the L0 layer and the L1 layer, which are related to the first recording layer and the second recording layer of the present invention, respectively, with reference to FIG. 5 and FIG. 6. FIG. 5 is a schematic plan view showing a position relationship between one track in the L0 layer and another track in the L1 layer corresponding to the one track, in the case where there arise the dimensional error, the pasting error (eccentric amount), and the irradiation position error which is corresponding to the radius of transmitted light in the L0 layer and the L1 layer, which are respectively related to the first recording layer and the second recording layer of the present invention. FIG. 6 is a graph showing one specific example of the relationship between the address and the radial position in the case where there arises at least one of the dimensional error, the pasting error (eccentric amount), and the irradiation position error in the L0 layer and the L1 layer, which are respectively related to the first recording layer and the second recording layer of the present invention.

(1-4-1) Relationship Between Address and Radial Position (Interpretation in Aiming at Plan View)

As shown in FIG. 5, a relationship between a circle Cr0 represented by one-address of the L0 layer and a circle Cr1 represented by another address of the L1 layer corresponding to the one address of the L0 layer, which is to satisfy the recording order even if there arise the three types of relative shifts, may be defined as a "relative deviation" which varies at each position of the circles.

Specifically, the maximum value of the relative deviation is indicated by the deviation of radial positions of a "M1−b point" on one track in the L1 layer and a "M0−b point" on one track in the L0 layer. On the other hand, the minimum value of the relative deviation is indicated by the deviation of radial positions of a "M1−s point" on one track in the L1 layer and a "M0−s point" on one track in the L0 layer.

(1-4-2) Relationship Between Address and Radial Position (Interpretation in aiming at Address)

As shown in FIG. 6, it is clear that if there arise the above-mentioned three types of relative shifts, the relationship between the address and the radial position in the L0 layer and the L1 layer is also shifted horizontally on the graph, by the value of the "relative deviation" corresponding to the relative shift.

Specifically, one relative deviation is indicated by the deviation between the radial position "24 mm" of the "A point" expressed by an address of "X0" in the L0 layer and the radial position of the "C point" expressed by an address of "Inv X0" in the L1 layer. On the other hand, another relative deviation is indicated by the deviation between the radial position "58 mm" of the "B point" expressed by an address of "X" in the L0 layer and the radial position of the "D point" expressed by an address of "Inv X" in the L1 layer.

(2) One Specific Example of Predetermined Position Relationship

Next, with reference to FIG. 7 to FIG. 9, a detailed explanation will be given to a "predetermined position relationship" (or a "predetermined relationship of a position") between a first point (Bx point: refer to FIG. 9 described later) of the L0 layer related to the first recording layer and a second point (Dx point: refer to FIG. 9 described later) defined in the L1 layer related to the second recording layer. FIG. 7 is a graph showing a relationship between (i) an address (x) in the L0 layer related to the first recording layer of the present invention and (ii) an ideal error (R(x)−Ri(x)) which includes the dimensional error and the eccentric amount and which means a difference between the radial position (R(x)) of the first point (Bx point) in the L0 layer and the radial position (Ri(x)) of an ideal point (Dix point) represented by an ideal address which is theoretically determined in the L1 layer corresponding to the first point (Bx point). Incidentally, in FIG. 7, the vertical axis indicates a difference (mm: milimeter) between the radial position (R(x)) of the first point (Bx point) and the radial position (Ri(x)) of the second point (Dx point), and the horizontal axis indicates the address in the L0 layer. Incidentally, the first point (Bx point) and the second point (Dx point) will be explained in FIG. 9 described later.

In the optical disc in the embodiment, as shown in FIG. 7, a difference "Def" between the radial position (R(x)) of the first point (Bx point) and the radial position of the second point (Dx point) is defined to be in a range shown by an acceptable area 10 showing by gray hatching in FIG. 7, with the address in the L0 layer as a variable.

Specifically, the acceptable area 10 satisfies the following conditional equations (1) and (2).

$$Def \leq DEVup(x) \quad (1)$$

$$Def \geq DEVlow(x) \quad (2)$$

"DEVup(x)" and "DEVlow(x)" in the above-mentioned equations (1) and (2) are expressed in view of the difference between (i) the radial position "R(x)" of the first point (Bx point) and (ii) the radial position "Ri(x)" of the ideal point (Dix point) corresponding to the first point (Bx point), as a reference, in addition to (iii) the dimensional error "tol" in the present invention, and (iv) the eccentric amount "ro" in the present invention. Incidentally the difference between (i) the radial position "R(x)" and (ii) the radial position "Ri(x)" is shown by a dotted line in FIG. 7.

Specifically, "DEVup(x)" and "DEVlow(x)" are expressed by the following equations (3), (4), (5), and (6).

$$DEVup(x)=<R(x)-Ri(x)>+<AbsMX(tol)+AbsMX(ro)> \quad (3)$$

$$DEVlow(x)=<R(x)-Ri(x)>-<AbsMX(tol)+AbsMX(ro)> \quad (4)$$

wherein, $$R(x)=Rt[<Sqr(D0/2)\times\pi+(x0-x)C>/\pi] \quad (5) \text{ and}$$

$$Ri(x)=Rt[<Sqr("D0/2"-a)\times\pi(Inv\,x-Inv\,x0)C>/\pi] \quad (6)$$

Incidentally, in the present invention, such a rule is made that the term composed only of alphabet, such as "Def", indicates a constant and the term including "(x)", such as "DEVup (x)" indicates a variable. "Abs(x)" is a function which indicates an absolute value. "AbsMX(x)" is a function which indicates a maximum absolute value of the variable "x". "Rt(x)" is a function which indicates the square root. "Sqr(x)" is a function which indicates the square. "Inv (x)" is a function which indicates a complement number. "/" means a calculation of dividing.

More specifically, with reference to FIG. 7, if the first point of the L0 layer is a "B point" with an address of "FDC 664h", for example, the radial position of a "D point" as being the second point of the L1 layer is defined to be included in the acceptable range expressed by the following equations (1a) and (2a).

(Radial position of the first point "B point")−(Radial position of the second point "D point")≦0.195 (1a)

(Radial position of the first point "B point")−(Radial position of the second point "D point")≧0.015 (2a)

Changing the above-mentioned equations (1a) and (2a) gives the following equations (1b) and (2b).

(Radial position of the second point "D point")≧(Radial position of the first point "B point")−0.195 (1b)

(Radial position of the second point "D point")≦(Radial position of the first point "B point")−0.015 (2b)

Here, it is assumed that a standard error "a" is 0.258 mm at the radial position of a "C point" with an address of "003000h", which is the end position of the data area in the L1 layer and which corresponds to (i.e. has a complement number relationship with) an "A point" with an address of "FFCFFFh" and at a radial position of "24 (mm)", which is the start position of the data area in the L0 layer. And in this case, a diameter "D0" may be 48.0 mm.

(2-1) Calculation of Predetermined Position Relationship (Interpretation in Aiming at Data Amount)

With reference to FIG. 8, Aiming at the data amount, a detailed explanation will be given to a procedure of calculating (i) the radial position (R(x)) of the first point "Bx point" and (ii) the radial position (Ri(x)) of the ideal point "Dix point" corresponding to the first point "Bx point", which are expressed by the above-mentioned equations (5) and (6). FIG. 8 are a conceptual view (FIG. 8(a)) showing a procedure of calculating the radial position (R(x)) of the first point "Bx point" in the L0 layer related to the first recording layer, and a conceptual view (FIG. 8(b)) showing a procedure of calculating the radial position (Ri(x)) of the ideal point "Dix point" represented by the ideal address which is theoretically determined in the L1 layer related to the second recording layer.

As shown in FIG. 8(a), an area size "Sr" of a circle having the radial position "R(x)" of the first point "Bx point" (with the address of "x") is equal to the sum of (i) an area size "S0" of a circle having a radial position "D0/2" of the above-mentioned "A point" (with an address of "x0"), for example, and (ii) a difference data amount "ΔS" which is from the address "x0" to the address "x".

Incidentally, the area size "Sr" is obtained by π(pai) times "R(x)" squared. The area size "S0" is obtained by π(pai) times "D0/2" squared. The difference data amount "ΔS" is obtained by a difference between the addresses "x0" and "x", times the predetermined coefficient "C". Thus, the following equation (5a) is obtained.

$$Sqr<R(x)>\times\pi=Sqr(D0/2)\times\pi+(x0-x)\times C \quad (5a)$$

wherein C=(32×1024×8×3.84×0.74)/("2048/2418"×"⁸/₁₆"× 26.16×1000000) (mm2/ECC block address)

In the same manner, as shown in FIG. 8(b), an area size "Sri" of a circle having the radial position "Ri(x)" of the ideal point "Di point" (with the address of "Inv x") is equal to the sum of (i) an area "S1" of a circle having a radial position "(D0/2)−a" of the above-mentioned "C point" (with an address of "Inv x0", for example, and (ii) a difference data amount "ΔS" which is from the address "Inv x0" to the address "Inv x". Thus, the following equation (6a) is obtained.

$$Sqr<Ri(x)>\times\pi=Sqr((D0/2)-a)\times\pi+(Inv\,x-Inv\,x0)\times C \quad (6a)$$

Particularly in the embodiment, in calculating the difference data amount "ΔS", the data amount is theoretically determined from the address on the basis of the premise that record line densities, which indicate the data amount per unit length, are equal in a first track and a second track.

Moreover, in calculating the difference data amount "ΔS", it may be also assumed that there is little or no influence of standard errors both at the start position "A point" of the data area in the L0 layer and at the end position "C point" of the data area in the L1 layer described above. In addition, in calculating the difference data amount "ΔS", so-called spiral integration calculation may be used.

(2-2) Calculation of Predetermined Position Relationship (Interpretation in Aiming at Address)

With reference to FIG. 9, aiming at the address, a detailed explanation will be given to a procedure of calculating (i) the radial position (R(x)) of the first point and (ii) the radial position (Ri(x)) of the ideal point corresponding to the first point, which are expressed by the above-mentioned equations (5) and (6). FIG. 9 is a graph showing a relationship between (i) both the radial position (R(x)) of the first point in the L0 layer related to the first recording layer of the present invention and the radial position (Ri(x)) of the ideal point represented by the ideal address which is theoretically determined in the L1 layer related to the second recording layer, (ii) the addresses of these radial positions.

As shown in FIG. 9, the radial position of the second point "Dx point" in the L1 layer is defined to be in the acceptable area 10 which is a range including the relative deviation based on the ideal point "Dix point", the dimensional error, and the eccentric amount, or the like.

Specifically, the radial position "Ri(x)" of the ideal point "Dix point" (with an address of "Inv x") can be calculated on the basis of (i) the radial position "(D0/2)−a" of the "C point"

(with an address of "Inv x0") and (ii) the difference data amount "ΔS" which is corresponding from the address "Inv x0" to the address "Inv x".

(3) Study of Operation and Effect of Information Recording Medium of Present Invention Next, with reference to FIG. 10 and FIG. 11, the operation and effect of the information recording medium of the present invention will be studied. FIG. 10 is a plan view of an optical disc schematically showing a recording area "S1" in a thick donut-shaped on the inner circumferential side and a recording area "S2" in a thin donut-shaped on the outer circumferential side, which correspond to a constant address offset value, in general. FIG. 11 is a cross sectional view schematically showing a length in the radial direction of the recording area shown in FIG. 10.

According to the information recording medium of the present invention, a difference between the radial position of the first point in the L0 Layer and radial position of the second point in the L1 Layer is defined to be in a predetermined range, from one to the other side out of the inner and outer circumferential sides, with the address of the L0 layer as a variable (or a variable parameter).

If the difference between the radial position of the first point in the L0 Layer and radial position of the second point in the L1 Layer is not defined to be in the predetermined range, from one to the other side out of the inner and outer circumferential sides, with the address of the L0 layer as a variable, the following technical problems occur. Namely, if the recording operation is performed by an information recording apparatus described later, on the basis of an address offset value, which is determined in order to reduce an influence of the relative shift between the L0 layer and the L1 layer on the outer circumferential side, for example, the address offset value satisfies the recording order beyond necessity on the inner circumferential side; in other words, a recording area to satisfy the recording order is wasted lengthily. More specifically, as shown in FIG. 10, in a CLV (Constant Linear Velocity) method and a ZCAV (Zoned Constant Angular Velocity) method, the area size of the recording area "S1" in a thick donut-shaped on the inner circumferential side is equal to the area size of the recording area "S2" in a thin donut-shaped on the outer circumferential side. Thus, as shown in FIG. 11, a width "r2'−r2" in the radial direction of the recording area "S2" on the outer circumferential side, which corresponds to the constant address offset value "Ax" expands to a width "r1'−r1" in the radial direction of the recording area "S1" on the inner circumferential side. Therefore, the address offset value "Ax" to satisfy the recording order on the outer circumferential side satisfies the recording order beyond necessity and is lengthy on the inner circumferential side.

As opposed to this, according to the information recording medium of the present invention, the difference between the radial position of the first point in the L0 Layer and the radial position of the second point in the L1 Layer is defined to be in the predetermined range, from one to the other side out of the inner and outer circumferential sides, with the address of the L0 layer as a variable. Thus, if the recording operation is performed by the information recording apparatus, on the basis of the address offset value, which is determined in order to reduce an influence of the relative shift between the L0 layer and the L1 layer on the outer circumferential side, for example, and which is added to or subtracted from the address for specifying a position in the L1 layer, the address offset value appropriately satisfies the recording order, obviously on the outer circumferential side, and also on the inner circumferential side.

In particular, this is more effective in a recording method in which the recording is alternately performed in each constant length, in two partial areas which face or are opposed to each other in the L0 layer and the L1 layer. Moreover, the term "face or opposed to" in the present invention may mean that the radial positions are substantially the same and that the radial positions are substantially the same including a predetermined margin or the like.

Consequently, in the recording operation to appropriately satisfy the recording order, the recording area is minimally wasted on the information recording medium of the present invention, and the recording area can be used more efficiently.

(4) Information Recording Apparatus of Present Invention

Next, with reference to FIG. 12 and FIG. 13, a detailed explanation will be given to the basic structure and the operation principle of the information recording apparatus in the embodiment of the present invention. Particularly, in the embodiment, the information recording apparatus of the present invention is applied to an information recording/reproducing apparatus for the optical disc.

(4-1) Basic Structure

At first, with reference to FIG. 12, the basic structure of an information recording/reproducing apparatus 300 according to the embodiment of the information recording apparatus of the present invention, and a host computer 400 will be discussed. FIG. 12 is a block diagram showing the basic structures of the information recording/reproducing apparatus according to the embodiment of the information recording apparatus of the present invention, and the host computer. Incidentally, the information recording/reproducing apparatus 300 has a function of recording the record data onto the optical disc 100 and a function of reproducing the record data recorded on the optical disc 100.

With reference to FIG. 12, the inner structure of information recording/reproducing apparatus 300 will be discussed. The information recording/reproducing apparatus 300 is an apparatus for recording the information onto the optical disc 100 and reading the information recorded on the optical disc 100, under the control of a CPU (Central Processing Unit) 305 for the drive.

The information recording/reproducing apparatus 300 is provided with: the optical disc 100; an optical pickup 301; a signal recording/reproducing device 302; an address detection device 303; an address operation device 304; the CPU (drive control device) 305; a spindle motor 306; a memory 307; a data input/output control device 308; and a bus 309.

The host computer 400 is provided with: a CPU (host control device) 401; a memory 402; an operation control device 403; an operation button 404; a display panel 405; a data input/output control device 406; and a bus 407.

In particular, the information recording/reproducing apparatus 300 may be constructed to communicate with an external network by containing the host computer 400 having a communication device, such as a modem, in the same housing. Alternatively, the CPU (host control device) 401 of the host computer 400 having a communication device, such as an i-link, may directly control the information recording/reproducing apparatus 300 through the data input/output control device 308 and the bus 309, to thereby communicate with the external network.

The optical pickup 301 is to perform the recording/reproduction with respect to the optical disc 100, and is provided with a semiconductor laser device, a lens, and the like. More specifically, the optical pickup 301 irradiates the optical disc 100 with a light beam, such as a laser beam, as reading light with a first power upon reproduction, and as writing light with a second power upon recording, with it modulated.

The signal recording/reproducing device 302 controls the optical pickup 301 and the spindle motor 306, to thereby perform the recording/reproduction with respect to the optical disc 100. More specifically, the signal recording/reproducing device 302 is provided with: a laser diode (LD) driver; a head amplifier; and the like, for example. The laser diode driver (LD driver) drives a not-illustrated semiconductor laser device located in the optical pickup 301. The head amplifier amplifies the output signal of the optical pickup 301, i.e. the reflective light of a light beam, and outputs the amplified signal. More specifically, the signal recording/reproducing device 302 drives the not-illustrated semiconductor laser device located in the optical pickup 301, in order to determine an optimum laser power by the recording and reproduction processes for an OPC (Optimum Power Control) pattern, together with a not-illustrated timing generator or the like, under the control of the CPU 305, upon an OPC process. In particular, the signal recording/reproducing device 302 constitutes one example of the "recording device" of the present invention, together with the optical pickup 301.

The address detection device 303 detects an address (address information) on the optical disc 100, from a reproduction signal, including a pre-format address signal or the like and outputted by the signal recording/reproducing device 302. Moreover, the address detection device 303 may be constructed to detect the offset information pre-recorded in the control data zone.

The address operation device 304 performs an operation or calculation, such as adding or subtracting the address offset value, with respect to the detected address.

The CPU (drive control device) 305 controls the entire information recording/reproducing apparatus 300 by giving an instruction to various controlling devices, through the bus 309. In particular, the CPU 305 determines the location of various recording areas, on the basis of the address operated or calculated by the address operation device 304. Then, the CPU 305 controls the signal recording/reproducing device 302 to record various record information into the determined various recording areas. Moreover, software or firmware for operating the CPU 305 is stored in the memory 307. In particular, the CPU 305 is one example of the "controlling device" of the present invention.

The spindle motor 306 is intended to rotate and stop the optical disc 100, and operates upon accessing the optical disc. More specifically, the spindle motor 306 is constructed to rotate and stop the optical disc 100 at a predetermined speed, under spindle servo from a not-illustrated servo unit or the like.

The memory 307 is used in the whole data processing and the OPC process or the like on the information recording/reproducing apparatus 300, including a buffer area for the record/reproduction data, an area used as an intermediate buffer when data is converted into the data that can be used on the signal recording/reproducing device 302, and the like. Moreover, the memory 307 is provided with: a ROM area into which a program for performing an operation as a recording device, i.e. firmware, is stored; a buffer for temporary storage of the record/reproduction data; a RAM area into which a parameter required for the operation of a firmware program or the like is stored; and the like. In particular, the above-mentioned offset amount (shift amount), and the offset information about the address offset value or the like calculated on the basis of the offset amount (shift amount) may be stored (memorized) in the memory 307.

The data input/output control device 308 controls the input/output of the data from the exterior with respect to the information recording/reproducing apparatus 300, to thereby perform storage to and export from the data buffer on the memory 307. A drive control command issued from the external host computer 400 (hereinafter referred to as a "host", as occasion demands) connected to the information recording/reproducing apparatus 300 through an interface, such as a SCSI and an ATAPI, is transmitted to the CPU 305 through the data input/output control device 308. Moreover, the record/reproduction data is also transmitted and received with respect to the host computer 400 through the data input/output control device 308, in the same manner.

The CPU (host control device) 401, the memory 402, the data input/output control device 406, and the bus 407 in the host computer 400 are substantially the same the corresponding constitutional elements in the information recording/reproducing apparatus 300.

In particular, the operation control device 403 receives an operation instruction and performs display with respect to the host computer 400, and transmits an instruction by the operation button 404, such as an instruction to record or reproduce, to the CPU 401. The CPU 401 may transmit a control command to the information recording/reproducing apparatus 300, through the data input/output control device 406, on the basis of instruction information from the operation control device 403, to thereby control the entire information recording/reproducing apparatus 300. In the same manner, the CPU 401 can transmit a command for requesting the information recording/reproducing apparatus 300 to transmit an operational state to the host, with respect to the information recording/reproducing apparatus 300. By this, the operational state of the information recording/reproducing apparatus 300, such as during recording and during reproduction, can be recognized, so that the CPU 401 can output the operational state of the information recording/reproducing apparatus 300 to the display panel 405, such as a fluorescent tube and an LCD, through the operation control device 403.

One specific example used by combining the information recording/reproducing apparatus 300 and the host computer 400, as explained above, is household equipment, such as recorder equipment for recording and reproducing video images. The recorder equipment records a video signal from a broadcast reception tuner and an external connection terminal, onto a disc, and outputs the video signal reproduced from the disc to external display equipment, such as a television. The operation as the recorder equipment is performed by executing a program stored in the memory 402, on the CPU 401. Moreover, in another specific example, the information recording/reproducing apparatus 300 is a disc drive (hereinafter referred to as a "drive", as occasion demands), and the host computer 400 is a personal computer and a work station. The host computer, such as the personal computer, and the drive are connected through the data input/output control device 308 (406), such as the SCSI and the ATAPI, and application, such as writing software, installed in the host computer controls the disc drive.

(4-2) Operation Principle

Next, with reference to FIG. 13, the operation principle of the information recording/reproducing apparatus according to the embodiment of the information recording apparatus of the present invention will be discussed. FIG. 13 is a flowchart showing a recording operation by the information recording/reproducing apparatus, according to the embodiment of the information recording/reproducing apparatus of the present invention.

As shown in FIG. 13, for example, various management information is obtained, as an initial operation, under the control of the CPU (drive control device) 305, in response to an instruction to record with respect to the optical disc 100, for example (step S101).

Then, under the control of the CPU 305, it is judged whether or not the above-mentioned address operation device 304 performs the recording with respect to the L1 layer, on the basis of an address in the recording area in which information is scheduled or expected to be recorded (step S102). Here, if the recording is performed with respect to the L1 layer (the step S102: Yes), it is further judged whether or not the recording area of the L0 layer which corresponds to the recording area of the L1 layer and which maintains a relative shift is already recorded; namely, it is judged whether or not the recording order is satisfied, under the control of the CPU 305 (step S103). If the recording area of the L0 layer is recorded; namely, if the recording order is satisfied (the step S103: Yes), the recording is performed with respect to the L1 layer (step S104).

On the other hand, as a result of the judgment in the step S103, if the recording area of the L0 layer is not recorded; namely, if the recording order is not satisfied (the step S103: No), an address of the recording area in which information is scheduled to be recorded is changed, to thereby designate another address, under the control of the CPU 305 (step S105).

Moreover, as a result of the judgment in the step S102, if the recording is not performed with respect to the L1 layer (the step S102: No), the recording is performed with respect to the L0 layer (step S106).

In the above-mentioned embodiments, the write-once type or rewritable optical disc, such as a two-layer type DVD-R, DVD+R, DVD-RW and DVD+RW, is explained as one example of the information recording medium. The present invention, however, can be applied to a multiple layer type optical disc, such as a three layer type. Moreover, it can be applied to a large-capacity recording medium, such as a disc which uses blue laser for recording/reproduction.

In the above-mentioned embodiments, the information recording/reproducing apparatus for additional recording or writing once, such as a DVD-R recorder and a DVD+R recorder, is explained as one example of the information recording apparatus. The present invention, however, can be applied to an information recording/reproducing apparatus for rewriting, such as a DVD-RW recorder and a DVD+RW recorder. Moreover, it can be applied to an information recording/reproducing apparatus for large-capacity recording, which uses blue laser for recording/reproduction.

The present invention is not limited to the above-described embodiments, and various changes may be made, if desired, without departing from the essence or spirit of the invention which can be read from the claims and the entire specification. An information recording medium, an information recording apparatus, an information recording method, and a computer program, which involve such changes, are also intended to be within the technical scope of the present invention.

INDUSTRIAL APPLICABILITY

The information recording medium, the information recording apparatus, the information recording method, and the computer program according to the present invention can be applied to a multilayer type optical disc, such as a CD and a DVD, for example, and also applied to an information recording apparatus, such as a DVD recorder. Moreover, they can be applied to an information recording apparatus or the like, which is mounted on or can be connected to various computer equipment for consumer use or business use, for example.

The invention claimed is:

1. An information recording medium comprising:
a first recording layer in which a spiral or concentric first track is formed to record a record information; and
a second recording layer which is irradiated with laser light through said first recording layer and in which a spiral or concentric second track is formed, the second track sharing a rotation center with the first track, wherein
said first recording layer has a first point represented by a first address, and
said second recording layer has a second point (i) which is represented by a second address corresponding to the first address and (ii) which can be defined on the basis of a predetermined position relationship with respect to the first point,
wherein the predetermined position relationship is set so as to include at least one of (i) a dimensional error held by each of said first recording layer and said second recording layer, (ii) an eccentric amount caused by a pasting error in said first recording layer and said second recording layer, and (iii) a radius of transmitted light which indicates a radius of an area formed on said first recording layer in which the laser light is irradiated to penetrate said first recording layer but not to focus on said first recording layer when the laser light is irradiated to focus on said second recording layer.

2. The information recording medium according to claim 1, wherein a radius of the first point is larger than a radius of the second point.

3. The information recording medium according to claim 1, wherein a value of the second address is bit-inverted by a value of the first address.

4. The information recording medium according to claim 1, wherein the predetermined position relationship is expressed by a function with the first address as a variable.

5. The information recording medium according to claim 1, wherein the predetermined position relationship is expressed by a table with the first address as a parameter at least.

6. The information recording medium according to claim 1, wherein the first address is defined on the basis of a predetermined unit which indicates a data amount.

7. The information recording medium according to claim 1, wherein the predetermined position relationship is set on the basis of a fact that record line densities which indicate a data amount per unit length in the first track and the second track, are numerically designated so as to calculate the record line densities at least in a desired range in recording areas in said first recording layer and said second recording layer.

8. The information recording medium according to claim 1, wherein
said first recording layer has a first reference point represented by a first reference address,
said second recording layer has a second reference point located at a radial position which is defined on a basis of both the first reference point and a standard radius difference which indicates an error in a standard radial position, and
the predetermined position relationship is based on an ideal error, which is a difference between (i) a radial position of the first point and (ii) a radial position of a second ideal point represented by a second ideal address, which is theoretically determined by: a difference data amount calculated by the first address and the first reference address; and a second reference address represented by the second reference point.

9. The information recording medium according to claim 8, wherein the first point represented by the first address is indicated by a predetermined relationship equation which uses (i) the difference data amount which is a difference between the first reference address and the first address and (ii) a value which indicates a record line density in said first recording layer, as a parameter.

10. The information recording medium according to claim 8, wherein the second point represented by the second address is indicated by a predetermined relationship equation which uses (i) the difference data amount which is a difference between the second reference address and the second address and (ii) a value which indicates a record line density in said second recording layer, as a parameter.

11. The information recording medium according to claim 1, wherein the predetermined position relationship is defined so that a radial position of the second point is in a predetermined range.

12. An information recording apparatus for recording the record information onto an information recording medium on which a first recording area can be formed in a first recording layer and a second recording area can be formed in a second recording layer, said information recording medium comprising:

the first recording layer in which a spiral or concentric first track is formed to record a record information; and the second recording layer which is irradiated with laser light through said first recording layer and in which a spiral or concentric second track is formed, the second track sharing a rotation center with the first track, wherein the first recording layer has a first point represented by a first address, and the second recording layer has a second point (i) which is represented by a second address corresponding to the first address and (ii) which can be defined on the basis of a predetermined position relationship with respect to the first point, wherein the predetermined position relationship is set so as to include at least one of (i) a dimensional error held by each of said first recording layer and said second recording layer, (ii) an eccentric amount caused by a pasting error in said first recording layer and said second recording layer, and (iii) a radius of transmitted light which indicates a radius of an area formed on said first recording layer in which the laser light is irradiated to penetrate said first recording layer but not to focus on said first recording layer when the laser light is irradiated to focus on said second recording layer, said information recording apparatus comprising:

a recording device capable of recording the record information into said first recording layer and said second recording layer;

a calculating device for calculating (i) the second address in said second recording layer corresponding to the first address which is desired in said first recording layer and (ii) a radial position of the second point represented by the second address and a radial position of the first point represented by the first address, with the first address as a parameter; and a controlling device for controlling said recording device to record the record information, while forming said second recording area, on the basis of at least one of the calculated second address and the calculated radial position of the second point.

13. An information recording method in an information recording apparatus comprising a recording device for recording the record information onto an information recording medium on which a first recording area can be formed in a first recording layer and a second recording area can be formed in a second recording layer, said information recording medium comprising:

the first recording layer in which a spiral or concentric first track is formed to record a record information; and the second recording layer which is irradiated with laser light through said first recording layer and in which a spiral or concentric second track is formed, the second track sharing a rotation center with the first track, wherein the first recording layer has a first point represented by a first address, and the second recording layer has a second point (i) which is represented by a second address corresponding to the first address and (ii) which can be defined on the basis of a predetermined position relationship with respect to the first point, wherein the predetermined position relationship is set so as to include at least one of (i) a dimensional error held by each of said first recording layer and said second recording layer, (ii) an eccentric amount caused by a pasting error in said first recording layer and said second recording layer, and (iii) a radius of transmitted light which indicates a radius of an area formed on said first recording layer in which the laser light is irradiated to penetrate said first recording layer but not to focus on said first recording layer when the laser light is irradiated to focus on said second recording layer, said information recording method comprising:

a calculating process of calculating (I) the second address in said second recording layer corresponding to the first address which is desired in said first recording layer and (ii) a radial position of the second point represented by the second address and a radial position of the first point represented by the first address, with the first address as a parameter; and a controlling process of controlling said recording device to record the record information, while forming said second recording area, on the basis of at least one of the calculated second address and the calculated radial position of the second point.

* * * * *